United States Patent
Stone et al.

(10) Patent No.: US 11,407,905 B2
(45) Date of Patent: Aug. 9, 2022

(54) ELECTRODEPOSITABLE COATING COMPOSITIONS

(71) Applicant: PPG Industries Ohio, Inc., Cleveland, OH (US)

(72) Inventors: David A. Stone, Allison Park, PA (US); Ellor J. Van Buskirk, Pittsburgh, PA (US); Craig A. Wilson, Allison Park, PA (US); Jo-Ann E. Bice, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 518 days.

(21) Appl. No.: 16/490,321

(22) PCT Filed: Mar. 1, 2018

(86) PCT No.: PCT/US2018/020391
§ 371 (c)(1),
(2) Date: Aug. 30, 2019

(87) PCT Pub. No.: WO2018/160799
PCT Pub. Date: Sep. 7, 2018

(65) Prior Publication Data
US 2021/0324209 A1 Oct. 21, 2021

Related U.S. Application Data

(60) Provisional application No. 62/465,215, filed on Mar. 1, 2017.

(51) Int. Cl.
*C09D 5/44* (2006.01)
*C09D 133/06* (2006.01)
*C09D 5/08* (2006.01)
*C25D 13/04* (2006.01)

(52) U.S. Cl.
CPC .............. *C09D 5/4411* (2013.01); *C09D 5/08* (2013.01); *C09D 5/448* (2013.01); *C09D 133/068* (2013.01); *C25D 13/04* (2013.01)

(58) Field of Classification Search
None
See application file for complete search history.

(56) References Cited

U.S. PATENT DOCUMENTS

| | | | | |
|---|---|---|---|---|
| 3,984,299 | A * | 10/1976 | Jerabek | C09B 67/0088 523/415 |
| 4,031,950 | A * | 6/1977 | Shultz | G05D 23/1931 165/286 |
| 4,104,147 | A * | 8/1978 | Marchetti | C09D 5/4434 204/502 |
| 6,017,432 | A * | 1/2000 | Boyd | C08G 18/3256 523/415 |
| 6,875,800 | B2 * | 4/2005 | Vanier | C09D 7/62 523/210 |
| 6,953,822 | B2 * | 10/2005 | Locken | C09J 151/003 524/460 |
| 2007/0015873 | A1 | 1/2007 | Fenn | |
| 2007/0059530 | A1 | 3/2007 | Ziegler | |
| 2013/0306477 | A1 | 11/2013 | Hsu et al. | |
| 2013/0306478 | A1 | 11/2013 | Hsu et al. | |
| 2014/0014524 | A1 | 1/2014 | Swanger et al. | |
| 2015/0114839 | A1 | 4/2015 | Hsu et al. | |
| 2015/0267856 | A1 | 9/2015 | Sandala et al. | |
| 2016/0145430 | A1* | 5/2016 | Junk | C09D 151/003 525/218 |
| 2021/0261799 | A1* | 8/2021 | Stone | C09D 175/04 |

* cited by examiner

*Primary Examiner* — Joseph D Anthony
(74) *Attorney, Agent, or Firm* — Charles M. Yeomans

(57) ABSTRACT

The present invention is directed to an electrodepositable coating composition comprising an acrylic polymer comprising a polymerization product of a polymeric dispersant and an aqueous dispersion of a second-stage ethylenically unsaturated monomer composition comprising greater than 40% by weight of a second-stage hydroxyl-functional (meth)acrylate monomer, based on the total weight of the second-stage ethylenically unsaturated monomer composition; an ionic salt group-containing film-forming polymer different from the acrylic polymer; and a curing agent. Also disclosed are coatings, coated substrates, and methods of coating a substrate.

25 Claims, No Drawings

ELECTRODEPOSITABLE COATING COMPOSITIONS

CROSS-REFERENCE TO RELATED APPLICATIONS

This application claims the benefit of U.S. Provisional Pat. Application Ser. No. 62/465,215, filed on Mar. 1, 2017, incorporated herein by reference.

FIELD OF THE INVENTION

The present invention is directed towards an electrodepositable coating composition, treated substrates and methods of coating substrates.

BACKGROUND OF THE INVENTION

Electrodeposition as a coating application method involves the deposition of a film-forming composition onto a conductive substrate under the influence of an applied electrical potential. Electrodeposition has gained popularity in the coatings industry because it provides higher paint utilization, outstanding corrosion resistance, and low environmental contamination as compared with non-electrophoretic coating methods. Both cationic and anionic electrodeposition processes are used commercially.

Oil contamination on substrate surfaces is problematic for electrodepositable coating compositions. Oil deposits, such as oils used in automotive assembly lines, result in the formation of defects in the cured coating in the form of craters. These craters form when the electrodepositable coating composition de-wets from the area around where the oil was deposited and the coating may cure around the oil deposit. The formation of craters affects both the smoothness and appearance of the cured coating and requires extra processing steps, such as sanding, to achieve the desired coating finish.

Another issue associated with electrodeposition as practiced industrially is in coverage over edges of the substrate being coated. The coating is relatively thin (i.e., low film-build) in these edge areas. Additionally, coatings may pull away from sharp edges and corners due to the increased surface energy needed to hold the coating in place. The issues tend to result in early and severe corrosion at the edge.

Therefore, an electrodepositable coating composition that provides improved crater control and edge coverage is desired.

SUMMARY OF THE INVENTION

The present invention provides an electrodepositable coating composition comprising: (a) an acrylic polymer comprising a polymerization product of a polymeric dispersant and a second stage ethylenically unsaturated monomer composition comprising greater than 40% by weight of a second stage hydroxyl-functional (meth)acrylate monomer, based on the total weight of the second stage ethylenically unsaturated monomer composition; (b) an ionic salt group-containing film-forming polymer different from the acrylic polymer; and (c) a curing agent.

The present invention also provides a method of coating a substrate comprising electrophoretically applying an electrodepositable coating composition of the present invention to at least a portion of the substrate and at least partially curing the coating composition to form an at least partially cured coating on the substrate.

The present invention further provides a coating formed by at least partially curing an electrodepositable coating composition comprising: (a) an acrylic polymer comprising a polymerization product of a polymeric dispersant and a second stage ethylenically unsaturated monomer composition comprising greater than 40% by weight of a second stage hydroxyl-functional (meth)acrylate monomer, based on the total weight of the second stage ethylenically unsaturated monomer composition; (b) an ionic salt group-containing film-forming polymer different from the acrylic polymer; and (c) a curing agent.

The present invention further provides a substrate coated with the electrodepositable coating composition of the present invention in an at least partially cured state.

DETAILED DESCRIPTION OF THE INVENTION

The present invention is directed to an electrodepositable coating composition comprising an acrylic polymer comprising a polymerization product of a polymeric dispersant and an aqueous dispersion of a second-stage ethylenically unsaturated monomer composition comprising greater than 40% by weight of a second-stage hydroxyl-functional (meth)acrylate monomer, based on the total weight of the second-stage ethylenically unsaturated monomer composition; an ionic salt group-containing film-forming polymer different from the acrylic polymer; and a curing agent.

According to the present invention, the term "electrodepositable coating composition" refers to a composition that is capable of being deposited onto an electrically conductive substrate under the influence of an applied electrical potential.

Acrylic Polymer

According to the present invention, the electrodepositable coating compositions of the present invention may comprise an acrylic polymer comprising a polymerization product of a polymeric dispersant and an aqueous dispersion of a second-stage ethylenically unsaturated monomer composition. As used herein, the term "acrylic polymer" refers to a polymerization product at least partially comprising the residue of (meth)acrylic monomers. The polymerization product may be formed by a two-stage polymerization process, wherein the polymeric dispersant is polymerized during the first stage and the second-stage ethylenically unsaturated monomer composition is added to an aqueous dispersion of the polymeric dispersant and polymerized in the presence of the polymeric dispersant that participates in the polymerization to form the acrylic polymer during the second stage.

According to the present invention, the polymeric dispersant may comprise any polymeric dispersant having a sufficient salt-group content to stably disperse and participate in a subsequent polymerization of a second-stage ethylenically unsaturated monomer composition and to provide for a resulting acrylic polymer that is stable in an electrodepositable coating composition. Although reference is made to the polymeric dispersant polymerized during the first stage, it will be understood that pre-formed or commercially available dispersants may be used and the prior formation of the polymeric dispersant would be considered to be first stage polymerization.

According to the present invention, the polymeric dispersant polymerized during the first stage may comprise the polymerization product of a first-stage ethylenically unsaturated monomer composition.

The first-stage ethylenically unsaturated monomer composition may comprise monoolefinic aliphatic compounds such as $C_1$-$C_{18}$ alkyl (meth)acrylates. Examples of suitable $C_1$-$C_{18}$ alkyl (meth)acrylates include, without limitation, methyl (meth)acrylate, ethyl (meth)acrylate, butyl (meth) acrylate, hexyl (meth)acrylate, octyl (meth)acrylate, isodecyl (meth)acrylate, stearyl (meth)acrylate, 2-ethylhexyl (meth)acrylate, isobornyl (meth)acrylate, t-butyl (meth) acrylate, and the like. The $C_1$-$C_{18}$ alkyl (meth)acrylates may be present in the first-stage ethylenically unsaturated monomer composition in an amount of up to 90% by weight, such as 40% to 80% by weight, such as 50% to 70% by weight, based on the total weight of the first-stage ethylenically unsaturated monomer composition. As used herein, (meth) acrylate and like terms encompasses both acrylates and methacrylates.

The first-stage ethylenically unsaturated monomer composition may comprise a first-stage hydroxyl-functional (meth)acrylate. As used herein the term "hydroxyl-functional (meth)acrylate" collectively refers both acrylates and methacrylates, which have hydroxyl functionality, i.e., comprise at least one hydroxyl functional group in the molecule. The first-stage hydroxyl-functional (meth)acrylate may comprise a hydroxyalkyl (meth)acrylate, such as, for example, hydroxyethyl (meth)acrylate, hydroxypropyl (meth)acrylate, hydroxybutyl (meth)acrylate, hydroxypentyl (meth)acrylate, and the like, as well as combinations thereof. The first-stage hydroxyl-functional (meth)acrylate may be present in the first-stage ethylenically unsaturated monomer composition in an amount of up to 40% by weight, such as 1% to 30% by weight, such as 5% to 25% by weight, based on the total weight of the first-stage ethylenically unsaturated monomer composition.

The first-stage ethylenically unsaturated monomer composition may comprise a vinyl aromatic compound. Non-limiting examples of suitable vinyl aromatic compounds include styrene, alpha-methyl styrene, alpha-chloromethyl styrene and/or vinyl toluene. The vinyl aromatic compound may be present in the first-stage ethylenically unsaturated monomer composition in an amount of up to 20% by weight, such as 0.5% to 15% by weight, such as 1% to 10% by weight, based on the total weight of the first-stage ethylenically unsaturated monomer composition.

The first-stage ethylenically unsaturated monomer composition may optionally comprise an epoxide functional monomer. The epoxide functional monomer allows for the incorporation of epoxide functional groups into the polymeric dispersant. The epoxide functional groups may be converted to cationic salt groups via reaction of the epoxide functional group with an amine and neutralization with acid. Examples of suitable epoxide functional monomers include glycidyl acrylate, glycidyl methacrylate, 3,4-epoxycyclohexylmethyl(meth)acrylate, 2-(3,4-epoxycyclohexyl)ethyl (meth)acrylate, or allyl glycidyl ether. The epoxide functional monomer may be present in an amount of up to 30% by weight, such as 5% to 25% by weight, such as 10% to 20% by weight, based on the total weight of the first-stage ethylenically unsaturated monomer composition.

The first-stage ethylenically unsaturated monomer composition may optionally comprise an acid-functional ethylenically unsaturated monomer. The acid-functional monomer allows for the incorporation of anionic salt groups into the polymeric dispersant by neutralization with a base. The acid-functional ethylenically unsaturated monomer may comprise phosphoric acid or carboxylic acid functional ethylenically unsaturated monomers, such as, for example, (meth)acrylic acid. The acid functional monomer may be present in the first-stage ethylenically unsaturated monomer composition in an amount of up to 20% by weight, such as 5% to 15% by weight, based on the total weight of the first-stage ethylenically unsaturated monomer composition.

The first-stage ethylenically unsaturated monomer composition may comprise a monomer comprising two or more ethylenically unsaturated groups per molecule. The monomer comprising two or more ethylenically unsaturated groups per molecule may comprise a monomer having two ethylenically unsaturated groups per molecule. Examples of suitable monomers having two ethylenically unsaturated groups per molecule include ethylene glycol dimethacrylate, allyl methacrylate, hexanediol diacrylate, methacrylic anhydride, tetraethylene glycol diacrylate, and/or tripropylene glycol diacrylate. Examples of monomers having three or more ethylenically unsaturated groups per molecule include ethoxylated trimethylolpropane triacrylate having 0 to 20 ethoxy units, [ethoxylated] trimethylolpropane trimethacrylate having 0 to 20 ethoxy units, di-pentaerythritoltriacrylate, pentaerythritol tetraacrylate, and/or di-pentaerythritolpentaacrylate. The monomer comprising two or more ethylenically unsaturated groups per molecule may be present in the first-stage ethylenically unsaturated monomer composition in an amount of up to 10% by weight, such as 0.1% to 10% by weight, such as 0.1% to 5% by weight, based on the total weight of the first-stage ethylenically unsaturated monomer composition. The use of a monomer comprising two or more ethylenically unsaturated groups per molecule in the first-stage ethylenically unsaturated monomer composition may result in a polymeric dispersant comprising ethylenically unsaturated groups. Accordingly, the polymeric dispersant may comprise ethylenically unsaturated groups.

The first-stage ethylenically unsaturated monomer composition may comprise, consist essentially of, or consist of a $C_1$-$C_{18}$ alkyl (meth)acrylate, a hydroxyl-functional (meth) acrylate, a vinyl aromatic compound, an epoxide functional ethylenically unsaturated monomer, and a monomer comprising two or more ethylenically unsaturated groups per molecule. Accordingly, the polymeric dispersant may comprise, consist essentially of, or consist of the residue of a $C_1$-$C_{18}$ alkyl (meth)acrylate, a hydroxyl-functional (meth) acrylate, a vinyl aromatic compound, an epoxide functional ethylenically unsaturated monomer, a monomer comprising two or more ethylenically unsaturated groups per molecule, and any amine incorporated into the polymeric dispersant through reaction with an epoxide functional group.

The first-stage ethylenically unsaturated monomer composition may comprise, consist essentially of, or consist of a $C_1$-$C_{18}$ alkyl (meth)acrylate, a hydroxyl-functional (meth) acrylate, a vinyl aromatic compound, an acid-functional ethylenically unsaturated monomer, and a monomer comprising two or more ethylenically unsaturated groups per molecule. Accordingly, the polymeric dispersant may comprise, consist essentially of, or consist of the residue of a $C_1$-$C_{18}$ alkyl (meth)acrylate, a hydroxyl-functional (meth) acrylate, a vinyl aromatic compound, an acid-functional ethylenically unsaturated monomer, and a monomer comprising two or more ethylenically unsaturated groups per molecule.

The first-stage ethylenically unsaturated monomer composition may be substantially free, essentially free, or completely free of nitrogen-containing monomers. As used herein, "nitrogen-containing monomers" refers to monomers added to the first-stage ethylenically unsaturated monomer composition and does not refer to any subsequent reaction with a nitrogen-containing compound (e.g., amine)

to form salt-groups on the polymeric dispersant. As used herein, the first-stage ethylenically unsaturated monomer composition is "substantially free" of nitrogen-containing monomers if nitrogen-containing monomers are present in the first-stage ethylenically unsaturated monomer composition in an amount of less than 5% by weight, based on the total weight of the first-stage ethylenically unsaturated monomer composition. As used herein, the first-stage ethylenically unsaturated monomer composition is "essentially free" of nitrogen-containing monomers if nitrogen-containing monomers are present in the first-stage ethylenically unsaturated monomer composition in an amount of less than 1% by weight, based on the total weight of the first-stage ethylenically unsaturated monomer composition. As used herein, the first-stage ethylenically unsaturated monomer composition is "completely free" of nitrogen-containing monomers if nitrogen-containing monomers are not present in the first-stage ethylenically unsaturated monomer composition, i.e., 0% by weight.

The polymeric dispersant may be prepared in organic solution by techniques well known in the art. For example, the polymeric dispersant may be prepared by conventional free radical initiated solution polymerization techniques wherein the first-stage ethylenically unsaturated monomer composition is dissolved in a solvent or a mixture of solvents and polymerized in the presence of a free radical initiator. Examples of suitable solvents which may be used for organic solution polymerization include alcohols, such as ethanol, tertiary butanol, and tertiary amyl alcohol; ketones, such as acetone, methyl ethyl ketone; and ethers, such as dimethyl ether of ethylene glycol. Examples of suitable free radical initiators include those which are soluble in the mixture of monomers, such as azobisisobutyronitrile, 2,2'-azobis(2-methylbutyronitrile), azobis-(alpha, gamma-dimethylvaleronitrile), tertiary-butyl perbenzoate, tertiary-butyl peracetate, benzoyl peroxide, and ditertiary-butyl peroxide. The free radical initiator may be present in an amount of 0.01% to 6% by weight, such as 1.0% to 4.0% by weight, such as 2.0% to 3.5% by weight, based on the total weight of the first-stage ethylenically unsaturated monomer composition. In examples, the solvent may be first heated to reflux and a mixture of the first-stage ethylenically unsaturated monomer composition and a free radical initiator may be added slowly to the refluxing solvent. The reaction mixture may be held at polymerizing temperatures so as to reduce the free monomer content to below 1.0%, such as below 0.5% by weight, based on the total weight of the first-stage ethylenically unsaturated monomer composition. Suitable specific conditions for forming such polymers include those set forth in the Examples section of the present application.

A chain transfer agent may be used in the synthesis of the polymeric dispersant, such as those that are soluble in the mixture of monomers. Suitable non-limiting examples of such agents include alkyl mercaptans, for example, tertiary-dodecyl mercaptan; ketones, such as methyl ethyl ketone; and chlorohydrocarbons, such as chloroform.

The polymeric dispersant may have a z-average molecular weight ($M_z$) of at least 200,000 g/mol, such as at least 250,000 g/mol, such as at least 300,000 g/mol, and may be no more than 2,000,000 g/mol, such as no more than 1,200,000 g/mol, such as no more than 900,000. The polymeric dispersant may have a z-average molecular weight ($M_z$) of 200,000 g/mol to 2,000,000 g/mol, such as 250,000 g/mol to 1,200,000 g/mol, such as 300,000 g/mol to 900,000 g/mol.

According to the present invention, the polymeric dispersant may have a weight average molecular weight ($M_w$) of at least 150,000 g/mol, such as at least 175,000 g/mol, such as at least 200,000 g/mol, and may have a weight average molecular weight of no more than 750,000 g/mol, such as no more than 400,000 g/mol, such as no more than 300,000 g/mol. According to the present invention, the polymeric dispersant may have a weight average molecular weight of 150,000 g/mol to 750,000 g/mol, such as 175,000 g/mol to 400,000 g/mol, such as 200,000 g/mol to 300,000 g/mol.

As used herein, unless otherwise stated, with respect to polymers having a z-average molecular weight ($M_z$) of less than 900,000, the terms "z-average molecular weight ($M_z$)" and "weight average molecular weight ($M_w$)" means the z-average molecular weight ($M_z$) and the weight average molecular weight ($M_w$) as determined by Gel Permeation Chromatography using Waters 2695 separation module with a Waters 410 differential refractometer (RI detector), polystyrene standards having molecular weights of from approximately 500 g/mol to 900,000 g/mol, dimethylformamide (DMF) with 0.05 M lithium bromide (LiBr) as the eluent at a flow rate of 0.5 mL/min, and one Asahipak GF-510 HQ column for separation. With respect to polymers having a z-average molecular weight ($M_z$) of greater than 900,000 g/mol, the term "z-average molecular weight ($M_z$)" and "weight average molecular weight ($M_w$)" means the z-average molecular weight ($M_z$) and the weight average molecular weight ($M_w$) as determined by Gel Permeation Chromatography ("GPC") using Waters 2695 separation module with a Waters 410 differential refractometer (RI detector), polystyrene standards having molecular weights of from approximately 500 g/mol to 3,000,000 g/mol, dimethylformamide (DMF) with 0.05 M lithium bromide (LiBr) as the eluent at a flow rate of 0.5 mL/min, and one Asahipak GF-7M HQ column for separation.

Ionic groups in the polymeric dispersant may be formed by at least partially neutralizing basic or acidic groups present in the polymeric dispersant with an acid or base, respectively. The ionic groups in the polymeric molecules may be charge neutralized by counter-ions. Ionic groups and charge neutralizing counter-ions may together form salt groups, such that the polymeric dispersant comprises an ionic salt group-containing polymeric dispersant.

Accordingly, the polymeric dispersant may be, prior to or during dispersion in a dispersing medium comprising water, at least partially neutralized by, for example, treating with an acid to form a water-dispersible cationic salt group-containing polymeric dispersant. As used herein, the term "cationic salt group-containing polymeric dispersant" refers to a cationic polymeric dispersant comprising at least partially neutralized cationic functional groups, such as sulfonium groups and ammonium groups, that impart a positive charge. Non-limiting examples of suitable acids are inorganic acids, such as phosphoric acid and sulfamic acid, as well as organic acids, such as, acetic acid and lactic acid, among others. Besides acids, salts such as dimethylhydroxyethylammonium dihydrogenphosphate and ammonium dihydrogenphosphate may be used to at least partially neutralize the polymeric dispersant. The polymeric dispersant may be neutralized to the extent of at least 50%, such as at least 70% of the total theoretical neutralization equivalent. As used herein, the "total theoretical neutralization equivalent" refers to a percentage of the stoichiometric amount of acid to the total amount of basic groups, such as amino groups, theoretically present on the polymer. As discussed above, amines may be incorporated into the cationic polymeric dispersant by reaction of an amine with epoxide functional groups present in the polymeric dispersant. The step of dispersion may be accomplished by combining the neutralized or partially neutralized cationic salt group-containing polymeric dispersant with the dispersing medium of the dispersing phase. Neutralization and dispersion may also be accomplished in one step by combining the polymeric dispersant and the dispersing medium. The polymeric dispersant (or its salt) may be added to the dispersing medium or the dispersing medium may be added to the polymeric dispersant (or its salt). The pH of the dispersion may be within the range of 5 to 9.

The cationic salt group-containing polymeric dispersant may comprise a sufficient cationic salt group content to stabilize a subsequent polymerization of a second-stage ethylenically unsaturated monomer composition (described below) and to provide for a resulting acrylic polymer that is stable in a cationic electrodepositable coating composition. Also, the cationic salt group-containing polymeric dispersant may have sufficient cationic salt group content so that, when used with the other film-forming resins in the cationic electrodepositable coating composition, the composition upon being subjected to electrodeposition conditions will deposit as a coating on the substrate. The cationic salt group-containing polymeric dispersant may comprise, for example, 0.1 to 5.0, such as 0.3 to 1.1 milliequivalents of cationic salt groups per gram of cationic salt group-containing polymeric dispersant.

According to the present invention, the polymeric dispersant may be, prior to or during dispersion in a dispersing medium comprising water, at least partially neutralized by, for example, treating with a base to form a water-dispersible anionic salt group-containing polymeric dispersant. As used herein, the term "anionic salt group-containing polymeric dispersant" refers to an anionic polymeric dispersant comprising at least partially neutralized anionic functional groups, such as carboxylic acid and phosphoric acid groups, that impart a negative charge. Non-limiting examples of suitable bases are amines, such as, for example, tertiary amines. Specific examples of suitable amines include, but are not limited to, trialkylamines and dialkylalkoxyamines, such as triethylamine, diethylethanol amine and dimethylethanolamine. The polymeric dispersant may be neutralized to the extent of at least 50 percent or, in some cases, at least 70 percent, or, in other cases 100 percent or more, of the total theoretical neutralization equivalent. The step of dispersion may be accomplished by combining the neutralized or partially neutralized anionic salt group-containing polymeric dispersant with the dispersing medium of the dispersing phase. Neutralization and dispersion may be accomplished in one step by combining the polymeric dispersant and the dispersing medium. The polymeric dispersant (or its salt) may be added to the dispersing medium or the dispersing medium may be added to the polymeric dispersant (or its salt). The pH of the dispersion may be within the range of 5 to 9.

The anionic salt group-containing polymeric dispersant may comprise a sufficient anionic salt group content to stabilize a subsequent polymerization of a second-stage ethylenically unsaturated monomer composition (described below) and to provide for a resulting acrylic polymer that is stable in an anionic electrodepositable coating composition. Also, the anionic salt group-containing polymeric dispersant may have sufficient anionic salt group content so that, when used with the other film-forming resins in the anionic electrodepositable coating composition, the composition upon being subjected to anionic electrodeposition conditions will deposit as a coating on the substrate. The anionic salt group-containing polymeric dispersant may contain from 0.1 to 5.0, such as 0.3 to 1.1 milliequivalents of anionic salt groups per gram of anionic salt group-containing polymeric dispersant.

According to the present invention, the second-stage ethylenically unsaturated monomer composition comprises, consists essentially of, or consists of a second-stage hydroxyl-functional (meth)acrylate monomer. The second-stage hydroxyl-functional (meth)acrylate monomer may comprise a primary hydroxyl group. The second-stage hydroxyl-functional (meth)acrylate monomer may comprise a secondary hydroxyl group. The second-stage hydroxyl-functional (meth)acrylate monomer may comprise one or more of a $C_1$-$C_9$ hydroxyalkyl (meth)acrylate, such as a $C_1$-$C_5$ hydroxyalkyl (meth)acrylate, such as, for example, hydroxyethyl (meth)acrylate, hydroxypropyl (meth)acrylate, hydroxybutyl (meth)acrylate, hydroxypentyl (meth)acrylate, or combinations thereof. The second-stage hydroxyl-functional (meth)acrylate monomer may be present in the second-stage ethylenically unsaturated monomer composition in an amount of greater than 40% by weight, such as at least 50% by weight, such as at least 75% by weight, such as at least 85% by weight, such as least 95% by weight, such as 100% by weight, and may be present in an amount of 50% to 100% by weight, such as 75% to 100% by weight, such as 85% to 100% by weight, such as 95% to 100% by weight, based on the total weight of the second-stage ethylenically unsaturated monomer composition.

The second-stage ethylenically unsaturated monomer composition may optionally comprise other ethylenically unsaturated monomers. The other ethylenically unsaturated monomers may comprise any ethylenically unsaturated monomers known in the art. Examples of other ethylenically unsaturated monomers that may be used in the second-stage ethylenically unsaturated monomer composition include, without limitation, the monomers described above with respect to the preparation of the polymeric dispersant, as well as di(meth)acrylates and poly(ethylene glycol) (meth) acrylates.

The second-stage ethylenically unsaturated monomer composition may be substantially free, essentially free, or completely free of diene monomers. As used herein, the second-stage ethylenically unsaturated monomer composition is "substantially free" of diene monomers if diene monomers are present in the second-stage ethylenically unsaturated monomer composition in an amount of less than 2% by weight, based on the total weight of the second-stage ethylenically unsaturated monomer composition. As used herein, the second-stage ethylenically unsaturated monomer composition is "essentially free" of diene monomers if diene monomers are present in the second-stage ethylenically unsaturated monomer composition in an amount of less than 0.1% by weight, based on the total weight of the second-stage ethylenically unsaturated monomer composition. As used herein, the second-stage ethylenically unsaturated monomer composition is "completely free" of diene monomers if diene monomers are not present in the second-stage ethylenically unsaturated monomer composition, i.e., 0% by weight.

The second-stage ethylenically unsaturated monomer composition may be substantially free, essentially free, or completely free of nitrogen-containing monomers. As used herein, "nitrogen-containing monomers" refers to monomers added to the second-stage ethylenically unsaturated monomer composition and does not refer to any subsequent reaction with a nitrogen-containing compound to form cationic salt-groups on the acrylic polymer. As used herein, the second-stage ethylenically unsaturated monomer composition is "substantially free" of nitrogen-containing monomers if nitrogen-containing monomers are present in the second-stage ethylenically unsaturated monomer composition in an amount of less than 1% by weight, based on the total weight of the second-stage ethylenically unsaturated monomer composition. As used herein, the second-stage ethylenically unsaturated monomer composition is "essentially free" of nitrogen-containing monomers if nitrogen-containing monomers are present in the second-stage ethylenically unsaturated monomer composition in an amount of less than 0.1% by weight, based on the total weight of the second-stage ethylenically unsaturated monomer composition. As used herein, the second-stage ethylenically unsaturated monomer composition is "completely free" of nitrogen-containing monomers if nitrogen-containing monomers are not present in the second-stage ethylenically unsaturated monomer composition, i.e., 0% by weight.

The second-stage ethylenically unsaturated monomer composition may be substantially free, essentially free, or completely free of monomers comprising three or more ethylenically unsaturated groups per molecule. As used herein, the second-stage ethylenically unsaturated monomer composition is "substantially free" of monomers comprising three or more ethylenically unsaturated groups per molecule if monomers comprising three or more ethylenically unsaturated groups per molecule are present in the second-stage ethylenically unsaturated monomer composition in an amount of less than 0.1% by weight, based on the total weight of the second-stage ethylenically unsaturated monomer composition. As used herein, the second-stage ethylenically unsaturated monomer composition is "essentially free" of monomers comprising three or more ethylenically unsaturated groups per molecule if monomers comprising three or more ethylenically unsaturated groups per molecule are present in the second-stage ethylenically unsaturated monomer composition in an amount of less than 0.01% by weight, based on the total weight of the second-stage ethylenically unsaturated monomer composition. As used herein, the second-stage ethylenically unsaturated monomer composition is "completely free" of monomers comprising three or more ethylenically unsaturated groups per molecule if monomers comprising three or more ethylenically unsaturated groups per molecule are not present in the second-stage ethylenically unsaturated monomer composition, i.e., 0% by weight.

According to the present invention, the acrylic polymer may comprise a polymerization product comprising at least 19% by weight of the residue of the polymeric dispersant, such as at least 30% by weight, such as at least 36% by weight, and may comprise no more than 50% by weight, such as no more than 45% by weight, such as no more than 40% by weight, the percent by weight being based on the total weight of the acrylic polymer. The acrylic polymer may comprise a polymerization product comprising 19% to 50% by weight of the residue of the polymeric dispersant, such as 30% to 45% by weight, such as 36% to 40% by weight, the percent by weight being based on the total weight of the acrylic polymer.

According to the present invention, the acrylic polymer may comprise a polymerization product comprising at least 50% by weight of the residue of the second-stage ethylenically unsaturated monomer composition, such as at least 55% by weight, such as at least 60% by weight, and may comprise no more than 81% by weight, such as no more than 70% by weight, such as no more than 64% by weight, the percent by weight being based on the total weight of the acrylic polymer. The acrylic polymer may comprise a polymerization product comprising 50% to 81% by weight of the residue of the second-stage ethylenically unsaturated monomer composition, such as 55% to 70% by weight, such as 60% to 64% by weight, the percent by weight being based on the total weight of the acrylic polymer.

The acrylic polymer may comprise a polymerization product comprising, consisting essentially of, or consisting of 19% to 50% by weight of the residue of the polymeric dispersant, such as 30% to 45% by weight, such as 36% to 40% by weight, and 50% to 81% by weight of the residue of the second-stage ethylenically unsaturated monomer composition, such as 55% to 70% by weight, such as 60% to 64% by weight, the percent by weight being based on the total weight of the acrylic polymer.

According to the present invention, the acrylic polymer may comprise a polymerization product of the polymeric dispersant and the second-stage ethylenically unsaturated monomer composition wherein the weight ratio of the second-stage ethylenically unsaturated monomer composition to the polymeric dispersant may be 1:1 to 4.3:1, such as 1.2:1 to 2.3:1, such as 1.5:1 to 1.7:1. The acrylic polymer may comprise a polymerization product of the polymeric dispersant and the second-stage ethylenically unsaturated monomer composition wherein the weight ratio of the residue of the second-stage ethylenically unsaturated monomer composition to the residue of the polymeric dispersant may be 1:1 to 4.3:1, such as 1.2:1 to 2.3:1, such as 1.5:1 to 1.7:1.

The acrylic polymer may comprise active hydrogen functional groups. As used herein, the term "active hydrogen functional groups" refers to those groups that are reactive with isocyanates as determined by the Zerewitnoff test as is described in the JOURNAL OF THE AMERICAN CHEMICAL SOCIETY, Vol. 49, page 3181 (1927). The active hydrogen functional groups may include hydroxyl groups, mercaptan groups, primary amine groups and/or secondary amine groups.

According to the present invention, the acrylic polymer may have a theoretical hydroxyl equivalent weight of at least 120 g/hydroxyl group ("OH"), such as at least 130 g/OH, such as at least 140 g/OH, such as at least 145 g/OH, and may be no more than 310 g/OH, such as no more than 275 g/OH, such as no more than 200 g/OH, such as no more than 160 g/OH. The acrylic polymer may have a theoretical hydroxyl equivalent weight of 120 g/OH to 310 g/OH, such as 130 g/OH to 275 g/OH, such as 140 g/OH to 200 g/OH, such as 145 g/OH to 160 g/OH. As used herein, the term "theoretical hydroxyl equivalent weight" refers to the weight in grams of acrylic polymer resin solids divided by the theoretical equivalents of hydroxyl groups present in the acrylic polymer resin, and may be calculated according to the following formula (1):

$$\text{hydroxyl equivalent weight} = \frac{\text{total grams acrylic polymer resin solds}}{\text{theoretical equivalents of OH}} \quad (1)$$

According to the present invention, the acrylic polymer may have a theoretical hydroxyl value of at least 190 mg KOH/gram acrylic polymer, such as at least 250 mg KOH/gram acrylic polymer, such as at least 320 mg KOH/gram acrylic polymer, such as at least 355 mg KOH/gram acrylic polymer, and may be no more than 400 mg KOH/gram acrylic polymer, such as no more than 390 mg KOH/gram acrylic polymer, such as no more than 380 mg KOH/gram acrylic polymer, such as no more than 370 mg KOH/gram acrylic polymer. The acrylic polymer may have a theoretical hydroxyl value of 190 to 400 mg KOH/gram acrylic polymer, such as 250 to 390 mg KOH/gram acrylic polymer, such as 320 to 380 mg KOH/gram acrylic polymer, such as 355 to 370 mg KOH/gram acrylic polymer. As used herein, the term "theoretical hydroxyl value" typically refers to the number of milligrams of potassium hydroxide required to neutralize the acetic acid taken up on acetylation of one gram of a chemical substance that contains free hydroxyl groups, and was herein determined by a theoretical calculation of the number of free hydroxyl groups theoretically present in one gram of the acrylic polymer.

According to the present invention, the acrylic polymer may have a z-average molecular weight ($M_z$) of at least 500,000 g/mol, such as at least 750,000 g/mol such as at least 1,400,000 g/mol, such as at least 1,500,000 g/mol, such as at least 1,800,000 g/mol, and may have a z-average molecular weight of no more than 5,000,000 g/mol, such as no more than 2,600,000 g/mol, such as no more than 2,200,000 g/mol, such as no more than 1,700,000 g/mol, such as no more than 950,000 g/mol. According to the present invention, the acrylic polymer may have a z-average molecular weight of 500,000 g/mol to 5,000,000 g/mol, such as 1,400,000 g/mol to 2,600,000 g/mol, such as 1,800,000 g/mol to 2,200,000 g/mol, such as 1,500,000 g/mol to 1,700,000 g/mol, such as 750,000 g/mol to 950,000 g/mol. The z-average molecular weight may be measured by gel permeation chromatography using polystyrene standards by the same procedure as described above.

According to the present invention, the acrylic polymer may have a weight average molecular weight ($M_w$) of at least 200,000 g/mol, such as at least 400,000 g/mol, such as at least 500,000 g/mol, and may have a weight average molecular weight of no more than 1,600,000 g/mol, such as no more than 900,000 g/mol, such as no more than 800,000 g/mol. According to the present invention, the acrylic polymer may have a weight average molecular weight of 200,000 g/mol to 1,600,000 g/mol, such as 400,000 g/mol to 900,000 g/mol, such as 500,000 g/mol to 800,000 g/mol. The weight average molecular weight may be measured by gel permeation chromatography using polystyrene standards by the same procedure as described above.

According to the present invention, the acrylic polymer may be substantially free, essentially free, or completely free of silicon. As used herein, "silicon" refers to elemental silicon or any silicon containing compound, such as an organosilicon compound including an alkoxysilane. As used herein, the acrylic polymer is "substantially free" of silicon if silicon is present in the acrylic polymer in an amount of less than 2% by weight, based on the total weight of the acrylic polymer. As used herein, the acrylic polymer is "essentially free" of silicon if silicon present in the acrylic polymer in an amount of less than 1% by weight, based on the total weight of the acrylic polymer. As used herein, the acrylic polymer is "completely free" of silicon if silicon is not present in the acrylic polymer, i.e., 0% by weight.

According to the present invention, the acrylic polymer may be substantially free, essentially free, or completely free of constitutional units formed from nitrogen-containing monomers. As used herein, "constitutional units formed from nitrogen-containing monomers" refers to constitutional units formed from monomers included in the first stage ethylenically unsaturated monomer composition and the second stage ethylenically unsaturated monomer composition, and does not refer to any reactions with amine to form cationic salt groups. As used herein, the acrylic polymer is "substantially free" of constitutional units formed from nitrogen-containing monomers if constitutional units formed from nitrogen-containing monomers is present in the acrylic polymer in an amount of less than 2% by weight, based on the total weight of the acrylic polymer. As used herein, the acrylic polymer is "essentially free" of constitutional units formed from nitrogen-containing monomers if constitutional units formed from nitrogen-containing monomers present in the acrylic polymer in an amount of less than 1% by weight, based on the total weight of the acrylic polymer. As used herein, the acrylic polymer is "completely free" of constitutional units formed from nitrogen-containing monomers if constitutional units formed from nitrogen-containing monomers are not present in the acrylic polymer, i.e., 0% by weight.

According to the present invention, the acrylic polymer may be formed by a two-stage polymerization process. The first-stage of the two-stage polymerization process comprises the formation of the polymeric dispersant from the first-stage ethylenically unsaturated monomer composition as described above. The second-stage of the two-stage polymerization process comprises the formation of an acrylic polymer comprising a polymerization product of the polymeric dispersant formed during the first stage and a second-stage ethylenically unsaturated monomer composition as described above. The second-stage of the polymerization process may comprise (a) dispersing the second-stage ethylenically unsaturated monomer composition and a free radical initiator in a dispersing medium comprising water in the presence of the at least partially neutralized polymeric dispersant to form an aqueous dispersion, and (b) subjecting the aqueous dispersion to emulsion polymerization conditions, for example, by heating in the presence of the free radical initiator, to polymerize the components to form an aqueous dispersion comprising the formed acrylic polymer. The time and temperature of polymerization may depend on one another, the ingredients selected and, in some cases, the scale of the reaction. For example, the polymerization may be conducted at 40° C. to 100° C. for 2 to 20 hours.

The free radical initiator utilized for the polymerization of the polymeric dispersant and the second stage ethylenically unsaturated monomer composition may be selected from any of those used for aqueous acrylic polymerization techniques, including redox pair initiators, peroxides, hydroperoxides, peroxydicarbonates, azo compounds and the like. The free radical initiator may be present in an amount of 0.01% to 5% by weight, such as 0.05% to 2.0% by weight, such as 0.1% to 1.5% by weight, based on the weight of the second stage ethylenically unsaturated monomer composition. A chain transfer agent that is soluble in the monomer composition, such as alkyl mercaptans, for example, tertiary-dodecyl mercaptan, 2-mercaptoethanol, isooctyl mercaptopropionate, n-octyl mercaptan or 3-mercapto acetic acid may be used in the polymerization of the polymeric dispersant and the second stage ethylenically unsaturated monomer composition. Other chain transfer agents such as ketones, for example, methyl ethyl ketone, and chlorocarbons such as chloroform may be used. The amount of chain transfer agent, if present, may be 0.1% to 6.0% by weight, based on the weight of second stage ethylenically unsaturated monomer composition. Relatively high molecular weight multifunctional mercaptans may be substituted, all or partially, for the chain transfer agent. These molecules may, for example, range in molecular weight from about 94 to 1,000 g/mol or more. Functionality may be from about 2 to about 4. Amounts of these multifunctional mercaptans, if present, may be 0.1% to 6.0% by weight, based on the weight of the second stage ethylenically unsaturated monomer composition.

According to the present invention, water may be present in the aqueous dispersion in amounts of 40% to 90% by weight, such as 50% to 75% by weight, based on total weight of the aqueous dispersion. The acrylic polymer may be added to the other components of the electrodepositable coating composition as an aqueous dispersion of the acrylic polymer.

In addition to water, the dispersing medium may further comprise organic cosolvents. The organic cosolvents may be at least partially soluble with water. Examples of such solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic cosolvents may be present in an amount of less than 10% by weight, such as less than 5% by weight, based on total weight of the dispersing medium.

According to the present invention, the acrylic polymer described above may be present in the electrodepositable coating composition in an amount of at least 0.1% by weight, such as at least 0.3% by weight, such as at least 0.5% by weight, and may be present in an amount of no more than 5% by weight, such as no more than 3% by weight, such as no more than 2% by weight, based on the total weight of the resin solids of the electrodepositable coating composition. The acrylic polymer may be present in the electrodepositable coating composition in an amount of 0.1% to 5% by weight, such as 0.3% to 3% by weight, such as 0.5% to 2% by weight, based on the total weight of the resin solids of the electrodepositable coating composition.

The use of a high concentration of hydroxyl-functional monomers in the second-stage ethylenically unsaturated monomer composition results in an acrylic polymer having a high-hydroxyl content. It has been surprisingly discovered that the use of the high-hydroxyl content acrylic polymer in an electrodepositable coating composition in the amounts taught herein results in a cured coating having improved edge coverage and crater resistance. It has been further surprisingly discovered that the use of the high-hydroxyl content acrylic polymer in an electrodepositable coating composition results in cured coatings having low-gloss wherein the amount of acrylic polymer needed to achieve such low-gloss is less than the amount needed for other art-known low-gloss additives.

The use of the acrylic polymer of the present invention in a coating composition in the amounts disclosed herein may result in a cured coating having a current flow of less than 100 mA, such as less than 75 mA, such as less than 60 mA, such as less than 50 mA, as measured by the Enamel Rating Procedure. The Enamel Rating Procedure is fully defined in the Examples. The current flow is an indication of the amount of edge coverage provided by the electrodeposited coating. The lower the current flow, the better the edge coverage, i.e., more coating is present on the edge as indicated by more resistance to the flow of current. The use of the acrylic polymer of the present invention in the amounts described herein provides better edge coverage over comparative coating compositions that do not use the acrylic polymer.

The use of the acrylic polymer of the present invention in a coating composition in the amounts disclosed herein may result in a cured coating having less than 75 rust spots, such as less than 50 rust spots, such as less than 40 rust spots, such as less than 35 rust spots, such as less than 30 rust spots, as measured according to the Salt-Spray Corrosion Procedure. The Salt-Spray Corrosion Procedure is fully defined in the Examples. The fewer rust spots present after exposure to salt-spray indicates better resistance to corrosion. The use of the acrylic polymer of the present invention in the amounts described herein results in the formation of fewer rust spots than comparative coating compositions that do not use the acrylic polymer.

The presence of the acrylic polymer in the amounts disclosed herein in an electrodepositable coating composition may result in a reduction in the depth of craters formed in the cured coating during the curing of the electrodepositable coating composition compared to an electrodepositable coating composition that does not include the acrylic polymer.

The presence of the acrylic polymer in the amounts disclosed herein in an electrodepositable coating composition may result in an increase in the percentage average edge coverage of the cured coating resulting therefrom. For example, the percentage average edge coverage may be improved by at least 20%, such as at least 40%, such as at least 60%, such as at least 80%, as measured according to the Burr Edge Coverage Test Method described in the Examples section below, compared to a substrate coated with a coating composition that does not comprise the acrylic polymer.

The presence of the acrylic polymer in the amounts disclosed herein in an electrodepositable coating composition may result in a reduction of the gloss of the cured coating. For example, coating compositions having the acrylic polymer present in an amount of 0.5% by weight, based on the total resin solids, may result in a cured coating having a 20° gloss value reduction of at least 20%, such as at least 40%, such as at least 50%, such as at least 58%, compared to a coating composition that does not include the acrylic polymer. For example, coating compositions having the acrylic polymer present in an amount of 0.5% by weight, based on the total resin solids, may result in a cured coating having a 60° gloss value reduction of at least 10%, such as at least 20%, such as at least 25%, such as at least 30%, compared to a coating composition that does not include the acrylic polymer. The gloss values of the cured coating may be measured using a BYK-Gardner Hazemeter (catalog no. 4601) according to ASTM D523. It should be noted that the acrylic polymer of the present invention may result in the low-gloss property with less acrylic polymer present in the coating composition than other art-known low-gloss additives. As used herein, the "gloss value reduction" refers to the % decrease in gloss value of a cured coating in comparison to a comparative cured coating, and is determined by dividing the experimental coating gloss value by the comparative coating gloss value and multiplying by 100, wherein the comparative coating is the result of a comparative coating composition that is the same as the experimental coating composition with the exception of the acrylic polymer. The degree of gloss value reduction will depend upon a number of factors, including the gloss of the comparative coating. For example, one of skill in the art would expect the addition of the acrylic polymer to a coating composition that already produces a coating having a relatively low gloss to result in a lower % reduction in gloss value with the addition of the acrylic polymer than an addition to a coating composition that produces a coating having relatively high gloss.

Ionic Salt Group-Containing Film-Forming Polymer

According to the present invention, the electrodepositable coating composition may further comprise an ionic salt group-containing film-forming polymer. The ionic salt group-containing film-forming polymer may be different from the acrylic polymer described above.

According to the present invention, the ionic salt group-containing film-forming polymer may comprise a cationic salt group containing film-forming polymer. The cationic salt group-containing film-forming polymer may be used in a cationic electrodepositable coating composition. As used herein, the term "cationic salt group-containing film-forming polymer" refers to polymers that include at least partially neutralized cationic groups, such as sulfonium groups and ammonium groups, that impart a positive charge. As used herein, the term "polymer" encompasses, but is not limited to, oligomers and both homopolymers and copolymers. The cationic salt group-containing film-forming polymer may comprise active hydrogen functional groups. As used herein, the term "active hydrogen functional groups" refers to those groups that are reactive with isocyanates as determined by the Zerewitinoff test as discussed above, and include, for example, hydroxyl groups, primary or secondary amine groups, and thiol groups. Cationic salt group-containing film-forming polymers that comprise active hydrogen functional groups may be referred to as active hydrogen-containing, cationic salt group-containing film-forming polymers.

Examples of polymers that are suitable for use as the cationic salt group-containing film-forming polymer in the present invention include, but are not limited to, alkyd polymers, acrylics, polyepoxides, polyamides, polyurethanes, polyureas, polyethers, and polyesters, among others.

More specific examples of suitable active hydrogen-containing, cationic salt group containing film-forming polymers include polyepoxide-amine adducts, such as the adduct of a polyglycidyl ethers of a polyphenol, such as Bisphenol A, and primary and/or secondary amines, such as are described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. A portion of the amine that is reacted with the polyepoxide may be a ketimine of a polyamine, as is described in U.S. Pat. No. 4,104,147 at col. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and U.S. Pat. No. 3,928,157 at col. 2, line 29 to col. 3, line 21, these portions of both of which are incorporated herein by reference, may be used.

Besides amine salt group-containing resins, quaternary ammonium salt group-containing resins may also be employed as a cationic salt group-containing film-forming polymer in the present invention. Examples of these resins are those which are formed from reacting an organic polyepoxide with a tertiary amine acid salt. Such resins are described in U.S. Pat. No. 3,962,165 at col. 2, line 3 to col. 11, line 7; 3,975,346 at col. 1, line 62 to col. 17, line 25 and 4,001,156 at col. 1, line 37 to col. 16, line 7, these portions of which being incorporated herein by reference. Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Pat. Application No. 12463B1 at pg. 2, line 1 to pg. 6, line 25, this portion of which being incorporated herein by reference, may also be employed.

Other suitable cationic salt group-containing film-forming polymers include those that may form photodegradation resistant electrodepositable coating compositions. Such polymers include the polymers comprising cationic amine salt groups which are derived from pendant and/or terminal amino groups that are disclosed in U.S. Pat. Application Publication No. 2003/0054193 A1 at paragraphs [0064] to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in U.S. Pat. Application Publication No. 2003/0054193 A1 at paragraphs [0096] to [0123], this portion of which being incorporated herein by reference.

The active hydrogen-containing, cationic salt group-containing film-forming polymer is made cationic and water dispersible by at least partial neutralization with an acid. Suitable acids include organic and inorganic acids. Non-limiting examples of suitable organic acids include formic acid, acetic acid, methanesulfonic acid, and lactic acid. Non-limiting examples of suitable inorganic acids include phosphoric acid and sulfamic acid. By "sulfamic acid" is meant sulfamic acid itself or derivatives thereof such as those having the formula:

wherein R is hydrogen or an alkyl group having 1 to 4 carbon atoms. Mixtures of the above-mentioned acids also may be used in the present invention.

The extent of neutralization of the cationic salt group-containing film-forming polymer may vary with the particular polymer involved. However, sufficient acid should be used to sufficiently neutralize the cationic salt-group containing film-forming polymer such that the cationic salt-group containing film-forming polymer may be dispersed in an aqueous dispersing medium. For example, the amount of acid used may provide at least 20% of all of the total theoretical neutralization. Excess acid may also be used beyond the amount required for 100% total theoretical neutralization. For example, the amount of acid used to neutralize the cationic salt group-containing film-forming polymer may be 0.1% based on the total amines in the active hydrogen-containing, cationic salt group-containing film-forming polymer. Alternatively, the amount of acid used to neutralize the active hydrogen-containing, cationic salt group-containing film-forming polymer may be 100% based on the total amines in the active hydrogen-containing, cationic salt group-containing film-forming polymer. The total amount of acid used to neutralize the cationic salt group-containing film-forming polymer may range between any combination of values, which were recited in the preceding sentences, inclusive of the recited values. For example, the total amount of acid used to neutralize the active hydrogen-containing, cationic salt group-containing film-forming polymer may be 20%, 35%, 50%, 60%, or 80% based on the total amines in the cationic salt group-containing film-forming polymer.

According to the present invention, the cationic salt group-containing film-forming polymer may be present in the cationic electrodepositable coating composition in an amount of at least 40% by weight, such as at least 50% by weight, such as at least 60% by weight, and may be present in the in an amount of no more than 90% by weight, such as no more than 80% by weight, such as no more than 75% by weight, based on the total weight of the resin solids of the electrodepositable coating composition. The cationic salt group-containing film-forming polymer may be present in the cationic electrodepositable coating composition in an amount of 40% to 90% by weight, such as 50% to 80% by weight, such as 60% to 75% by weight, based on the total weight of the resin solids of the electrodepositable coating composition. As used herein, the "resin solids" include the ionic salt group-containing film-forming polymer, the curing agent, the acrylic polymer, and any additional water-dispersible non-pigmented component(s) present in the electrodepositable coating composition.

According to the present invention, the ionic salt group containing film-forming polymer may comprise an anionic salt group containing film-forming polymer. As used herein, the term "anionic salt group containing film-forming polymer" refers to an anionic polymer comprising at least partially neutralized anionic functional groups, such as carboxylic acid and phosphoric acid groups that impart a negative charge. As used herein, the term "polymer" encompasses, but is not limited to, oligomers and both homopolymers and copolymers. The anionic salt group-containing film-forming polymer may comprise active hydrogen functional groups. As used herein, the term "active hydrogen functional groups" refers to those groups that are reactive with isocyanates as determined by the Zerewitinoff test as discussed above, and include, for example, hydroxyl groups, primary or secondary amine groups, and thiol groups. Anionic salt group-containing film-forming polymers that comprise active hydrogen functional groups may be referred to as active hydrogen-containing, anionic salt group-containing film-forming polymers. The anionic salt group containing film-forming polymer may be used in an anionic electrodepositable coating composition.

The anionic salt group-containing film-forming polymer may comprise base-solubilized, carboxylic acid group-containing film-forming polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable anionic electrodepositable resin comprises an alkyd-aminoplast vehicle, i.e., a vehicle containing an alkyd resin and an amine-aldehyde resin. Another suitable anionic electrodepositable resin composition comprises mixed esters of a resinous polyol. Other acid functional polymers may also be used such as phosphatized polyepoxide or phosphatized acrylic polymers. Exemplary phosphatized polyepoxides are disclosed in U.S. Pat. Application Publication No. 2009-0045071 at [0004]-[0015] and U.S. patent application Ser. No. 13/232,093 at [0014]-[0040], the cited portions of which being incorporated herein by reference. Also suitable are resins comprising one or more pendent carbamate functional groups, such as those described in U.S. Pat. No. 6,165,338.

According to the present invention, the anionic salt group-containing film-forming polymer may be present in the anionic electrodepositable coating composition in an amount of at least 50% by weight, such as at least 55% by weight, such as at least 60% by weight, and may be present in an amount of no more than 90% by weight, such as no more than 80% by weight, such as no more than 75% by weight, based on the total weight of the resin solids of the electrodepositable coating composition. The anionic salt group-containing film-forming polymer may be present in the anionic electrodepositable coating composition in an amount 50% to 90%, such as 55% to 80%, such as 60% to 75%, based on the total weight of the resin solids of the electrodepositable coating composition. As used herein, the "resin solids" include the ionic salt group-containing film-forming polymer, the curing agent, the acrylic polymer, and any additional water-dispersible non-pigmented component(s) present in the electrodepositable coating composition.

Curing Agent

According to the present invention, the electrodepositable coating composition of the present invention may further comprise a curing agent. The curing agent may be reactive with the acrylic polymer and the ionic salt group-containing film-forming polymer. The curing agent may react with the reactive groups, such as active hydrogen groups, of the ionic salt group-containing film-forming polymer and the acrylic polymer to effectuate cure of the coating composition to form a coating. As used herein, the term "cure", "cured" or similar terms, as used in connection with the electrodepositable coating compositions described herein, means that at least a portion of the components that form the electrodepositable coating composition are crosslinked to form a coating. Additionally, curing of the electrodepositable coating composition refers to subjecting said composition to curing conditions (e.g., elevated temperature) leading to the reaction of the reactive functional groups of the components of the electrodepositable coating composition, and resulting in the crosslinking of the components of the composition and formation of an at least partially cured coating. Non-limiting examples of suitable curing agents are at least partially blocked polyisocyanates, aminoplast resins and phenoplast resins, such as phenolformaldehyde condensates including allyl ether derivatives thereof.

Suitable at least partially blocked polyisocyanates include aliphatic polyisocyanates, aromatic polyisocyanates, and mixtures thereof. The curing agent may comprise an at least partially blocked aliphatic polyisocyanate. Suitable at least partially blocked aliphatic polyisocyanates include, for example, fully blocked aliphatic polyisocyanates, such as those described in U.S. Pat. No. 3,984,299 at col. 1 line 57 to col. 3 line 15, this portion of which is incorporated herein by reference, or partially blocked aliphatic polyisocyanates that are reacted with the polymer backbone, such as is described in U.S. Pat. No. 3,947,338 at col. 2 line 65 to col. 4 line 30, this portion of which is also incorporated herein by reference. By "blocked" is meant that the isocyanate groups have been reacted with a compound such that the resultant blocked isocyanate group is stable to active hydrogens at ambient temperature but reactive with active hydrogens in the film forming polymer at elevated temperatures, such as between 90° C. and 200° C. The polyisocyanate curing agent may be a fully blocked polyisocyanate with substantially no free isocyanate groups.

The polyisocyanate curing agent may comprise a diisocyanate, higher functional polyisocyanates or combinations thereof. For example, the polyisocyanate curing agent may comprise aliphatic and/or aromatic polyisocyanates. Aliphatic polyisocyanates may include (i) alkylene isocyanates, such as trimethylene diisocyanate, tetramethylene diisocyanate, pentamethylene diisocyanate, hexamethylene diisocyanate ("HDI"), 1,2-propylene diisocyanate, 1,2-butylene diisocyanate, 2,3-butylene diisocyanate, 1,3-butylene diisocyanate, ethylidene diisocyanate, and butylidene diisocyanate, and (ii) cycloalkylene isocyanates, such as 1,3-cyclopentane diisocyanate, 1,4-cyclohexane diisocyanate, 1,2-cyclohexane diisocyanate, isophorone diisocyanate, methylene bis(4-cyclohexylisocyanate) ("HMDI"), the cyclo-trimer of 1,6-hexmethylene diisocyanate (also known as the isocyanurate trimer of HDI, commercially available as Desmodur N3300 from Convestro AG), and meta-tetramethylxylylene diisocyanate (commercially available as TMXDI® from Allnex SA). Aromatic polyisocyanates may include (i) arylene isocyanates, such as m-phenylene diisocyanate, p-phenylene diisocyanate, 1,5-naphthalene diisocyanate and 1,4-naphthalene diisocyanate, and (ii) alkarylene isocyanates, such as 4,4'-diphenylene methane ("MDI"), 2,4-tolylene or 2,6-tolylene diisocyanate ("TDI"), or mixtures thereof, 4,4-toluidine diisocyanate and xylylene diisocyanate. Triisocyanates, such as triphenyl methane-4, 4',4"-triisocyanate, 1,3,5-triisocyanato benzene and 2,4,6-triisocyanato toluene, tetraisocyanates, such as 4,4'-diphenyldimethyl methane-2,2',5,5'-tetraisocyanate, and polymerized polyisocyanates, such as tolylene diisocyanate dimers and trimers and the like, may also be used. The curing agent may comprise a blocked polyisocyanate selected from a polymeric polyisocyanate, such as polymeric HDI, polymeric MDI, polymeric isophorone diisocyanate, and the like. The curing agent may also comprise a blocked trimer of hexamethylene diisocyanate available as Desmodur N3300® from Covestro AG. Mixtures of polyisocyanate curing agents may also be used.

The polyisocyanate curing agent may be at least partially blocked with at least one blocking agent selected from a 1,2-alkane diol, for example 1,2-propanediol; a 1,3-alkane diol, for example 1,3-butanediol; a benzylic alcohol, for example, benzyl alcohol; an allylic alcohol, for example, allyl alcohol; caprolactam; a dialkylamine, for example dibutylamine; and mixtures thereof. The polyisocyanate curing agent may be at least partially blocked with at least one 1,2-alkane diol having three or more carbon atoms, for example 1,2-butanediol.

Other suitable blocking agents include aliphatic, cycloaliphatic, or aromatic alkyl monoalcohols or phenolic compounds, including, for example, lower aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines may also be used as blocking agents. Suitable glycol ethers include ethylene glycol butyl ether, diethylene glycol butyl ether, ethylene glycol methyl ether and propylene glycol methyl ether. Other suitable blocking agents include oximes, such as methyl ethyl ketoxime, acetone oxime and cyclohexanone oxime.

The curing agent may comprise an aminoplast resin. Aminoplast resins are condensation products of an aldehyde with an amino- or amido-group carrying substance. Condensation products obtained from the reaction of alcohols and an aldehyde with melamine, urea or benzoguanamine may be used. However, condensation products of other amines and amides may also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2, 4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. Suitable aldehydes include formaldehyde, acetaldehyde, crotonaldehyde, acrolein, benzaldehyde, furfural, glyoxal and the like.

The aminoplast resins may contain methylol or similar alkylol groups, and at least a portion of these alkylol groups may be etherified by a reaction with an alcohol to provide organic solvent-soluble resins. Any monohydric alcohol may be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cello solves and Carbitols, and halogen-substituted or other substituted alcohols, such as 3-chloropropanol and butoxyethanol.

Non-limiting examples of commercially available aminoplast resins are those available under the trademark CYMEL® from Allnex Belgium SA/NV, such as CYMEL 1130 and 1156, and RESIMENE® from INEOS Melamines, such as RESIMENE 750 and 753. Examples of suitable aminoplast resins also include those described in U.S. Pat. No. 3,937,679 at col. 16, line 3 to col. 17, line 47, this portion of which being hereby incorporated by reference. As is disclosed in the aforementioned portion of the '679 patent, the aminoplast may be used in combination with the methylol phenol ethers.

Phenoplast resins are formed by the condensation of an aldehyde and a phenol. Suitable aldehydes include formaldehyde and acetaldehyde. Methylene-releasing and aldehyde-releasing agents, such as paraformaldehyde and hexamethylene tetramine, may also be utilized as the aldehyde agent. Various phenols may be used, such as phenol itself, a cresol, or a substituted phenol in which a hydrocarbon radical having either a straight chain, a branched chain or a cyclic structure is substituted for a hydrogen in the aromatic ring. Mixtures of phenols may also be employed. Some specific examples of suitable phenols are p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain.

Aminoplast and phenoplast resins, as described above, are described in U.S. Pat. No. 4,812,215 at col. 6, line 20 to col. 7, line 12, the cited portion of which being incorporated herein by reference.

The curing agent may be present in the cationic electrodepositable coating composition in an amount of at least 10% by weight, such as at least 20% by weight, such as at least 25% by weight, and may be present in an amount of no more than 60% by weight, such as no more than 50% by weight, such as no more than 40% by weight, based on the total weight of the resin solids of the electrodepositable coating composition. The curing agent may be present in the cationic electrodepositable coating composition in an amount of 10% to 60% by weight, such as 20% to 50% by weight, such as 25% to 40% by weight, based on the total weight of the resin solids of the electrodepositable coating composition.

The curing agent may be present in the anionic electrodepositable coating composition in an amount of at least 10% by weight, such as at least 20% by weight, such as at least 25% by weight, and may be present in an amount of no more than 50% by weight, such as no more than 45% by weight, such as no more than 40% by weight, based on the total weight of the resin solids of the electrodepositable coating composition. The curing agent may be present in the anionic electrodepositable coating composition in an amount of 10% to 50% by weight, such as 20% to 45% by weight, such as 25% to 40% by weight, based on the total weight of the resin solids of the electrodepositable coating composition.

Further Components of the Electrodepositable Coating Compositions

The electrodepositable coating composition according to the present invention may optionally comprise one or more further components in addition to the acrylic polymer, the ionic salt group-containing film-forming polymer and the curing agent described above.

According to the present invention, the electrodepositable coating composition may optionally comprise a catalyst to catalyze the reaction between the curing agent and the polymers. Examples of catalysts suitable for cationic electrodepositable coating compositions include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate); or a cyclic guanidine as described in U.S. Pat. No. 7,842,762 at col. 1, line 53 to col. 4, line 18 and col. 16, line 62 to col. 19, line 8, the cited portions of which being incorporated herein by reference. Examples of catalysts suitable for anionic electrodepositable coating compositions include latent acid catalysts, specific examples of which are identified in WO 2007/118024 at [0031] and include, but are not limited to, ammonium hexafluoroantimonate, quaternary salts of $SbF_6$ (e.g., NACURE® XC-7231), t-amine salts of $SbF_6$ (e.g., NACURE® XC-9223), Zn salts of triflic acid (e.g., NACURE® A202 and A218), quaternary salts of triflic acid (e.g., NACURE® XC-A230), and diethylamine salts of triflic acid (e.g., NACURE® A233), all commercially available from King Industries, and/or mixtures thereof. Latent acid catalysts may be formed by preparing a derivative of an acid catalyst such as para-toluenesulfonic acid (pTSA) or other sulfonic acids. For example, a well-known group of blocked acid catalysts are amine salts of aromatic sulfonic acids, such as pyridinium para-toluenesulfonate. Such sulfonate salts are less active than the free acid in promoting crosslinking. During cure, the catalysts may be activated by heating.

According to the present invention, the electrodepositable coating compositions of the present invention may optionally comprise crater control additives which may be incorporated into the coating composition, such as, for example, a polyalkylene oxide polymer which may comprise a copolymer of butylene oxide and propylene oxide. According to the present invention, the molar ratio of butylene oxide to propylene oxide may be at least 1:1, such as at least 3:1, such as at least 5:1, and in some instances, may be no more than 50:1, such as no more than 30:1, such as no more than 20:1. According to the present invention, the molar ratio of butylene oxide to propylene oxide may be 1:1 to 50:1, such as 3:1 to 30:1, such as 5:1 to 20:1.

The polyalkylene oxide polymer may comprise at least two hydroxyl functional groups, and may be monofunctional, difunctional, trifunctional, or tetrafunctional. As used herein, a "hydroxyl functional group" comprises an —OH group. For clarity, the polyalkylene oxide polymer may comprise additional functional groups in addition to the hydroxyl functional group(s). As used herein, "monofunctional," when used with respect to the number of hydroxyl functional groups a particular monomer or polymer comprises, means a monomer or polymer comprising one (1) hydroxyl functional group per molecule. As used herein, "difunctional," when used with respect to the number of hydroxyl functional groups a particular monomer or polymer comprises, means a monomer or polymer comprising two (2) hydroxyl functional groups per molecule. As used herein, "trifunctional," when used with respect to the number of hydroxyl functional groups a particular monomer or polymer comprises, means a monomer or polymer comprising three (3) hydroxyl functional groups per molecule. As used herein, "tetrafunctional," when used with respect to the number of hydroxyl functional groups a particular monomer or polymer comprises, means a monomer or polymer comprising four (4) hydroxyl functional groups per molecule.

The hydroxyl equivalent weight of the polyalkylene oxide polymer may be at least 100 g/mol, such as at least 200 g/mol, such as at least 400 g/mol, and may be no more than 2,000 g/mol, such as no more than 1,000 g/mol, such as no more than 800 g/mol. The hydroxyl equivalent weight of the polyalkylene oxide polymer may be 100 g/mol to 2,000 g/mol, such as 200 g/mol to 1,000 g/mol, such as 400 g/mol to 800 g/mol. As used herein, with respect to the polyalkylene oxide polymer, the "hydroxyl equivalent weight" is determined by dividing the molecular weight of the polyalkylene oxide polymer by the number of hydroxyl groups present in the polyalkylene oxide polymer.

The polyalkylene oxide polymer may have a z-average molecular weight ($M_z$) of at least 200 g/mol, such as at least 400 g/mol, such as at least 600 g/mol, and may be no more than 5,000 g/mol, such as no more than 3,000 g/mol, such as no more than 2,000 g/mol. According to the present invention, the polyalkylene oxide polymer may have a z-average molecular weight of 200 g/mol to 5,000 g/mol, such as 400 g/mol to 3,000 g/mol, such as 600 g/mol to 2,000 g/mol. As used herein, with respect to polyalkylene oxide polymers having a z-average molecular weight ($M_z$) of less than 900,000, the term "z-average molecular weight ($M_z$)" means the z-average molecular weight ($M_z$) as determined by Gel Permeation Chromatography using Waters 2695 separation module with a Waters 410 differential refractometer (RI detector), polystyrene standards having molecular weights of from approximately 500 g/mol to 900,000 g/mol, tetrahydrofuran (THF) with 0.05 M lithium bromide (LiBr) as the eluent at a flow rate of 0.5 mL/min, and one Asahipak GF-510 HQ column for separation.

The polyalkylene oxide polymer may be present in the electrodepositable coating composition in an amount of at least 0.1% by weight based on the total weight of the resin blend solids, such as at least 0.5% by weight, such as at least 0.75% by weight, and in some instances, may be present in the electrodepositable coating composition in an amount of no more than 10% by weight based on the total weight of the resin blend solids, such as no more than 4% by weight, such as no more than 3% by weight. The polyalkylene oxide polymer may be present in the electrodepositable coating composition in an amount of at 0.1% by weight to 10% by weight based on the total weight of the resin blend solids, such as 0.5% by weight to 4% by weight, such as 0.75% by weight to 3% by weight.

According to the present invention, the electrodepositable coating composition may comprise other optional ingredients, such as a pigment composition and, if desired, various additives such as fillers, plasticizers, anti-oxidants, biocides, UV light absorbers and stabilizers, hindered amine light stabilizers, defoamers, fungicides, dispersing aids, flow control agents, surfactants, wetting agents, or combinations thereof. Alternatively, the electrodepositable coating composition may be completely free of any of the optional ingredients, i.e., the optional ingredient is not present in the electrodepositable coating composition. The pigment composition may comprise, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion may be expressed as the pigment-to-resin weight ratio, and may be within the range of 0.03 to 0.6, when pigment is used. The other additives mentioned above may be present in the electrodepositable coating composition in amounts of 0.01% to 3% by weight, based on total weight of the resin solids of the electrodepositable coating composition.

According to the present invention, the electrodepositable coating composition may comprise water and/or one or more organic solvent(s). Water can for example be present in amounts of 40% to 90% by weight, such as 50% to 75% by weight, based on total weight of the electrodepositable coating composition. Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic solvents may typically be present in an amount of less than 10% by weight, such as less than 5% by weight, based on total weight of the electrodepositable coating composition. The electrodepositable coating composition may in particular be provided in the form of a dispersion, such as an aqueous dispersion.

According to the present invention, the total solids content of the electrodepositable coating composition may be at least 1% by weight, such as at least 5% by weight, and may be no more than 50% by weight, such as no more than 40% by weight, such as no more than 20% by weight, based on the total weight of the electrodepositable coating composition. The total solids content of the electrodepositable coating composition may be from 1% to 50% by weight, such as 5% to 40% by weight, such as 5% to 20% by weight, based on the total weight of the electrodepositable coating composition. As used herein, "total solids" refers to the non-volatile content of the electrodepositable coating composition, i.e., materials which will not volatilize when heated to 110° C. for 15 minutes.

Substrates

According to the present invention, the electrodepositable coating composition may be electrophoretically applied to a substrate. The cationic electrodepositable coating composition may be electrophoretically deposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise cold rolled steel, hot rolled steel, steel coated with zinc metal, zinc compounds, or zinc alloys, such as electrogalvanized steel, hot-dipped galvanized steel, galvanealed steel, and steel plated with zinc alloy. Aluminum alloys of the 2XXX, 5XXX, 6XXX, or 7XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. Suitable metal substrates for use in the present invention include those that are often used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, industrial structures and components such as appliances, including washers, dryers, refrigerators, stoves, dishwashers, and the like, agricultural equipment, lawn and garden equipment, air conditioning units, heat pump units, lawn furniture, and other articles. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091.

Methods of Coating, Coatings and Coated Substrates

The present invention is also directed to methods for coating a substrate, such as any one of the electroconductive substrates mentioned above. According the present invention such method may comprise electrophoretically applying an electrodepositable coating composition as described above to at least a portion of the substrate and curing the coating composition to form an at least partially cured coating on the substrate. According to the present invention, the method may comprise (a) electrophoretically depositing onto at least a portion of the substrate an electrodepositable coating composition of the present invention and (b) heating the coated substrate to a temperature and for a time sufficient to cure the electrodeposited coating on the substrate. According to the present invention, the method may optionally further comprise (c) applying directly to the at least partially cured electrodeposited coating one or more pigment-containing coating compositions and/or one or more pigment-free coating compositions to form a top coat over at least a portion of the at least partially cured electrodeposited coating, and (d) heating the coated substrate of step (c) to a temperature and for a time sufficient to cure the top coat.

According to the present invention, the cationic electrodepositable coating composition of the present invention may be deposited upon an electrically conductive substrate by placing the composition in contact with an electrically conductive cathode and an electrically conductive anode, with the surface to be coated being the cathode. Following contact with the composition, an adherent film of the coating composition is deposited on the cathode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the cationic electrodepositable coating composition is electrodeposited over at least a portion of the electroconductive substrate, the coated substrate is heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. The coated substrate may be heated to a temperature ranging from 250° F. to 450° F. (121.1° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, the film thickness of the electrodeposited coating, level and type of catalyst present in the composition and the like. For purposes of the present invention, all that is necessary is that the time be sufficient to effect cure of the coating on the substrate. For example, the curing time can range from 10 minutes to 60 minutes, such as 20 to 40 minutes. The thickness of the resultant cured electrodeposited coating may range from 15 to 50 microns.

According to the present invention, the anionic electrodepositable coating composition of the present invention may be deposited upon an electrically conductive substrate by placing the composition in contact with an electrically conductive cathode and an electrically conductive anode, with the surface to be coated being the anode. Following contact with the composition, an adherent film of the coating composition is deposited on the anode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the anionic electrodepositable coating composition is electrodeposited over at least a portion of the electroconductive substrate, the coated substrate may be heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. The coated substrate may be heated to a temperature ranging from 200° F. to 450° F. (93° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, film thickness of the electrodeposited coating, level and type of catalyst present in the composition and the like. For purposes of the present invention, all that is necessary is that the time be sufficient to effect cure of the coating on the substrate. For example, the curing time may range from 10 to 60 minutes, such as 20 to 40 minutes. The thickness of the resultant cured electrodeposited coating may range from 15 to 50 microns.

The electrodepositable coating compositions of the present invention may also, if desired, be applied to a substrate using non-electrophoretic coating application techniques, such as flow, dip, spray and roll coating applications. For non-electrophoretic coating applications, the coating compositions may be applied to conductive substrates as well as non-conductive substrates such as glass, wood and plastic.

The present invention is further directed to a coating formed by at least partially curing the electrodepositable coating composition described herein.

The present invention is further directed to a substrate that is coated, at least in part, with the electrodepositable coating composition described herein in an at least partially cured state.

Multi-Layer Coating Composites

The electrodepositable coating compositions of the present invention may be utilized in an electrocoating layer that is part of a multi-layer coating composite comprising a substrate with various coating layers. The coating layers may include a pretreatment layer, such as a phosphate layer (e.g., zinc phosphate layer), an electrocoating layer which results from the aqueous resinous dispersion of the present invention, and suitable top coat layers (e.g., base coat, clear coat layer, pigmented monocoat, and color-plus-clear composite compositions). It is understood that suitable topcoat layers include any of those known in the art, and each independently may be waterborne, solventborne, in solid particulate form (i.e., a powder coating composition), or in the form of a powder slurry. The top coat typically includes a film-forming polymer, crosslinking material and, if a colored base coat or monocoat, one or more pigments. According to the present invention, the primer layer is disposed between the electrocoating layer and the base coat layer. According to the present invention, one or more of the topcoat layers are applied onto a substantially uncured underlying layer. For example, a clear coat layer may be applied onto at least a portion of a substantially uncured basecoat layer (wet-on-wet), and both layers may be simultaneously cured in a downstream process.

Moreover, the top coat layers may be applied directly onto the electrodepositable coating layer. In other words, the substrate lacks a primer layer. For example, a basecoat layer may be applied directly onto at least a portion of the electrodepositable coating layer.

It will also be understood that the top coat layers may be applied onto an underlying layer despite the fact that the underlying layer has not been fully cured. For example, a clearcoat layer may be applied onto a basecoat layer even though the basecoat layer has not been subjected to a curing step. Both layers may then be cured during a subsequent curing step thereby eliminating the need to cure the basecoat layer and the clearcoat layer separately.

According to the present invention, additional ingredients such as colorants and fillers may be present in the various coating compositions from which the top coat layers result. Any suitable colorants and fillers may be used. For example, the colorant may be added to the coating in any suitable form, such as discrete particles, dispersions, solutions and/or flakes. A single colorant or a mixture of two or more colorants can be used in the coatings of the present invention. It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into the coatings by grinding or simple mixing. Colorants may be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

The colorant may be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions may also be produced by crystallization, precipitation, gas phase condensation, and chemical attrition (i.e., partial dissolution). In order to minimize re-agglomeration of nanoparticles within the coating, a dispersion of resin-coated nanoparticles may be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. patent application Ser. No. 10/876,031 filed Jun. 24, 2004, which is incorporated herein by reference, and U.S. Provisional Pat. Application No. 60/482,167 filed Jun. 24, 2003, which is also incorporated herein by reference.

According to the present invention, special effect compositions that may be used in one or more layers of the multi-layer coating composite include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions may provide other perceptible properties, such as reflectivity, opacity or texture. For example, special effect compositions may produce a color shift, such that the color of the coating changes when the coating is viewed at different angles. Example color effect compositions are identified in U.S. Pat. No. 6,894,086, incorporated herein by reference. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

According to the present invention, a photosensitive composition and/or photochromic composition, which reversibly alters its color when exposed to one or more light sources, can be used in a number of layers in the multi-layer composite. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition may be colorless in a non-excited state and exhibit a color in an excited state. Full color-change may appear within milliseconds to several minutes, such as from 20 seconds to 60 seconds. Example photochromic and/or photosensitive compositions include photochromic dyes.

According to the present invention, the photosensitive composition and/or photochromic composition may be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. patent application Ser. No. 10/892,919 filed Jul. 16, 2004 and incorporated herein by reference.

For purposes of this detailed description, it is to be understood that the invention may assume alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

In this application, the use of the singular includes the plural and plural encompasses singular, unless specifically stated otherwise. For example, although reference is made herein to "an" ionic salt group-containing film-forming polymer, "an" acrylic polymer, "a" polymeric dispersant, "a" monomer, a combination (i.e., a plurality) of these components may be used. In addition, in this application, the use of "or" means "and/or" unless specifically stated otherwise, even though "and/or" may be explicitly used in certain instances.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

In view of the foregoing, the present invention thus relates in particular, without being limited thereto, to the following aspects:

1. An electrodepositable coating composition comprising:
 (a) an acrylic polymer comprising a polymerization product of a polymeric dispersant and a second stage ethylenically unsaturated monomer composition comprising greater than 40% by weight of a second stage hydroxyl-functional (meth)acrylate monomer, based on the total weight of the second stage ethylenically unsaturated monomer composition;
 (b) an ionic salt group-containing film-forming polymer different from the acrylic polymer; and
 (c) a curing agent.

2. The electrodepositable coating composition of preceding Aspect 1, wherein the second stage ethylenically unsaturated monomer composition comprises at least 50% by weight, such as at least 75% by weight, such as 95% to 100% by weight, of the second stage hydroxyl-functional (meth)acrylate monomer, based on the total weight of the second stage ethylenically unsaturated monomer composition.

3. The electrodepositable coating composition of any one of the preceding Aspects 1 and 2, wherein the second stage hydroxyl-functional (meth)acrylate monomer comprises a primary hydroxyl group.

4. The electrodepositable coating composition of any one of the preceding Aspects, wherein the second stage hydroxyl-functional (meth)acrylate monomer comprises a $C_1$-$C_5$ hydroxyalkyl (meth)acrylate.

5. The electrodepositable coating composition of any one of the preceding Aspects, wherein the second stage hydroxyl-functional (meth)acrylate monomer comprises hydroxyethyl (meth)acrylate, hydroxypropyl (meth)acrylate, hydroxybutyl (meth)acrylate, hydroxypentyl (meth)acrylate or a combination thereof.

6. The electrodepositable coating composition of any one of the preceding Aspects, wherein the polymeric dispersant comprises cationic or anionic groups.

7. The electrodepositable coating composition of any one of the preceding Aspects, wherein the polymeric dispersant comprises a polymerization product of a first stage ethylenically unsaturated monomer composition comprising:
 (a) a $C_1$-$C_{18}$ alkyl (meth)acrylate;
 (b) a first stage hydroxyl-functional (meth)acrylate;
 (c) a vinyl aromatic compound;
 (d) an epoxide functional ethylenically unsaturated monomer; and
 (e) a monomer comprising two or more ethylenically unsaturated groups per molecule.

8. The electrodepositable coating composition of preceding Aspect 7, wherein the first stage ethylenically unsaturated monomer composition comprises:
 (a) 50 to 70% by weight of the $C_1$-$C_{18}$ alkyl (meth)acrylate;
 (b) 5 to 25% by weight of the first stage hydroxyl-functional (meth)acrylate;
 (c) 1 to 10% by weight of the vinyl aromatic compound;
 (d) 10 to 20% by weight of the epoxide functional ethylenically unsaturated monomer; and
 (e) 0.1 to 5% by weight of the monomer comprising two or more ethylenically unsaturated groups per molecule, the percent by weight being based on the total weight of the first stage ethylenically unsaturated monomer composition.

9. The electrodepositable coating composition of any one of the preceding Aspects 1 to 6, wherein the polymeric dispersant comprises a polymerization product of a first stage ethylenically unsaturated monomer composition comprising:

(a) a $C_1$-$C_{18}$ alkyl (meth)acrylate;
(b) a first stage hydroxyl-functional (meth)acrylate;
(c) a vinyl aromatic compound;
(d) an acid-functional ethylenically unsaturated monomer; and
(e) a monomer comprising two or more ethylenically unsaturated groups per molecule.

10. The electrodepositable coating composition of preceding Aspect 9, wherein the first stage ethylenically unsaturated monomer composition comprises:

(a) 50 to 70% by weight of the $C_1$-$C_{18}$ alkyl (meth) acrylate;
(b) 5 to 25% by weight of the first stage hydroxyl-functional (meth)acrylate;
(c) 1 to 10% by weight of the vinyl aromatic compound;
(d) 5 to 15% by weight of the acid-functional ethylenically unsaturated monomer; and
(e) 0.1 to 5% by weight of the monomer comprising two or more ethylenically unsaturated groups per molecule, the percent by weight being based on the total weight of the first stage ethylenically unsaturated monomer composition.

11. The electrodepositable coating composition of any one of the preceding Aspects, wherein the acrylic polymer comprises 19% to 50% by weight, such as 30% to 45% by weight, such as 36% to 40% by weight, of the residue of the polymeric dispersant, and 50% to 81% by weight, such as 55% to 70% by weight, such as 60% to 64% by weight, of the residue of the ethylenically unsaturated monomer composition, the % by weight being based on the total weight of the acrylic polymer.

12. The electrodepositable coating composition of any one of the preceding Aspects, wherein the weight ratio of the second stage ethylenically unsaturated monomer composition to the polymeric dispersant is 1:1 to 4.3:1, such as 1.2:1 to 2.3:1, such as 1.5:1 to 1.7:1.

13. The electrodepositable coating composition of any one of the preceding Aspects, wherein the acrylic polymer has a theoretical hydroxyl-equivalent weight of 120 g/OH to 310 g/OH, such as 130 g/OH to 275 g/OH, such as 145 g/OH to 160 g/OH.

14. The electrodepositable coating composition of any one of the preceding Aspects, wherein the acrylic polymer has a theoretical hydroxyl value of 190 mg of KOH/g of acrylic polymer to 400 mg of KOH/g of acrylic polymer, such as 320 mg of KOH/g of acrylic polymer to 380 mg of KOH/g of acrylic polymer, such as 355 mg of KOH/g of acrylic polymer to 370 mg of KOH/g of acrylic polymer.

15. The electrodepositable coating composition of any one of the preceding Aspects, wherein the acrylic polymer has a z-average molecular weight of 500,000 g/mol to 5,000,000 g/mol, such as 1,400,000 g/mol to 2,600,000 g/mol, such as 1,800,000 g/mol to 2,200,000 g/mol, as determined by Gel Permeation Chromatography using polystyrene calibration standards.

16. The electrodepositable coating composition of any one of the preceding Aspects, wherein the acrylic polymer has a weight average molecular weight of 200,000 g/mol to 1,600,000 g/mol, such as 400,000 g/mol to 900,000 g/mol, such as 500,000 g/mol to 800,000 g/mol, as determined by Gel Permeation Chromatography using polystyrene calibration standards.

17. The electrodepositable coating composition of any one of the preceding Aspects, wherein the acrylic polymer is substantially free of silicon and/or is substantially free of constitutional units formed from nitrogen-containing monomers.

18. The electrodepositable coating composition of any one of the preceding Aspects, wherein the second stage ethylenically unsaturated monomer composition is substantially free of monomers comprising three or more ethylenically unsaturated groups per molecule.

19. The electrodepositable coating composition of any one of the preceding Aspects, wherein the ionic salt group-containing film-forming polymer comprises a cationic salt group-containing film-forming polymer.

20. The electrodepositable coating composition of any one of the preceding Aspects 1 to 18, wherein the ionic salt group-containing film-forming polymer comprises an anionic salt group-containing film-forming polymer.

21. The electrodepositable coating composition of any one of the preceding Aspects, wherein the ionic salt group-containing film-forming polymer comprises active hydrogen functional groups.

22. The electrodepositable coating composition of any one of the preceding Aspects, wherein the curing agent comprises functional groups reactive with active hydrogen functional groups.

23. The electrodepositable coating composition of any one of preceding Aspects, wherein the curing agent comprises aminoplast resins, phenoplast resins, at least partially blocked polyisocyanates, or combinations thereof.

24. The electrodepositable coating composition of any one of the preceding Aspects, wherein the curing agent is present in the electrodepositable coating composition in an amount of 10% to 60% by weight, based on the total weight of resin solids of the electrodepositable coating composition.

25. The electrodepositable coating composition of any one of preceding Aspects, wherein the acrylic polymer is present in the electrodepositable coating composition in an amount of 0.1% to 5% by weight, based on the total weight of resin solids of the electrodepositable coating composition.

26. The electrodepositable coating composition of any one of the preceding Aspects, wherein the ionic salt group-containing film-forming polymer is present in the electrodepositable coating composition in an amount of 40% to 90% by weight, based on the total weight of resin solids of the electrodepositable coating composition.

27. The electrodepositable coating composition of any one of preceding Aspects further comprising a polyalkylene oxide polymer.

28. A method of coating a substrate comprising electrophoretically applying an electrodepositable coating composition of any one of the preceding Aspects 1 to 27 to at least a portion of the substrate and at least partially curing the coating composition to form an at least partially cured coating on the substrate.

29. An at least partially cured coating formed by at least partially curing an electrodepositable coating composition of any one of the preceding Aspects 1 to 27.

30. A substrate coated with the electrodepositable coating composition of any one of the preceding Aspects 1 to 27 in an at least partially cured state.

31. The substrate according to preceding Aspects 29 or 30, wherein the coating has a 20° gloss value reduction of at least 20% and/or a 60° gloss value reduction of at least 10%, when the acrylic polymer is present in the electrodepositable coating composition in an amount of 0.5% by weight based on the total resin solids, the gloss values measured using a BYK-Gardner Hazemeter (catalog no. 4601) according to ASTM D523, and the gloss value reduction compared to a substrate coated with a coating composition that does not comprise the acrylic polymer.

32. The substrate according to any one of preceding Aspects 30 and 31, wherein the coated substrate has current flow of less than 100 mA as measured by the Enamel Rating Procedure described in the specification and/or wherein the coated substrate has less than 75 rust spots as measured by the Salt-Spray Corrosion Procedure described in the specification.

33. The substrate according to any one of preceding Aspects 31 to 32, wherein the coated substrate the percentage average edge coverage of the coated substrate is improved by at least 20%, such as at least 40%, such as at least 60%, such as at least 80%, as measured according to the Burr Edge Coverage Test Method, compared to a substrate coated with a coating composition that does not comprise the acrylic polymer.

Illustrating the invention are the following examples, which, however, are not to be considered as limiting the invention to their details. Unless otherwise indicated, all parts and percentages in the following examples, as well as throughout the specification, are by weight.

EXAMPLES

Example 1: Synthesis of a Cationic Salt Group-Containing Polymeric Dispersant

TABLE 1

| Charge # | Material | Amount (g) |
| --- | --- | --- |
| 1 | Dowanol ™ PnB | 65.0 |
|   | Dowanol ™ PM | 83.5 |
|   | Butyl Cellosolve | 198.5 |
|   | Deionized Water | 13.9 |
| 2 | Ethyl Acrylate | 353.4 |
|   | Styrene | 62.1 |
|   | 2-Hydroxypropyl Methacrylate | 93.0 |
|   | Methyl methacrylate | 260.4 |
|   | Glycidyl methacrylate | 139.5 |
|   | Allyl methacrylate | 11.5 |
|   | t-Dodecyl mercaptan | 9.3 |
| 3 | Vazo ™ 67[1] | 18.5 |
|   | Dowanol ™ PNB | 29.5 |
|   | Dowanol ™ PM | 14.8 |
|   | Methyl isobutyl ketone | 11.8 |
| 4 | Lupersol 7M50 | 18.6 |
|   | Dowanol ™ PNB | 14.8 |
|   | Dowanol ™ PM | 7.4 |
| 5 | Butyl Cellosolve | 80.3 |
| 6 | Diethanolamine | 99.6 |
| 7 | Deionized Water | 3,334.0 |
|   | Formic Acid (90% in water) | 34.20 |
| 8 | Deionized Water | 1,151.5 |

[1]2,2'-azobis(2-methylbutyronitrile) free radical initiator available from The Chemours Company A cationic salt group-containing polymeric dispersant was prepared from the components listed in Table 1 according to the following procedure: Charge 1 was added to a 4-necked flask fitted with a thermocouple, nitrogen sparge, and a mechanical stirrer. Under a nitrogen blanket and agitation, the flask was heated to reflux with a temperature set point of 100° C. Charges 2 and 3 were added dropwise from an addition funnel over 150 minutes followed by a 30-minute hold. After increasing the temperature to 120° C., charge 4 was subsequently added over 15 minutes followed by a 10-minute hold. The temperature was decreased to 110° C. while adding charge 5 to help cool the reaction. Charge 6 was added and the temperature was held at 115° C. for 3 hours. During the hold, charge 7 was heated to approximately 35-40° C. in a separate container outfitted with a mechanical stirrer. After the hold, the contents from the reactor were poured into the container that includes charge 7 under rapid agitation and then held for 60 minutes. Charge 8 was added under agitation as the dispersion continued to cool to ambient temperature (about 25° C.).

The solids content of the resulting aqueous dispersion of the cationic polymeric dispersant was determined by adding a quantity of the dispersion to a tared aluminum dish, recording the weight of the dispersion and dish, heating the test specimen in the dish for 60 minutes at 110° C. in an oven, allowing the dish to cool, reweighing the dish to determine the amount of non-volatile content remaining, and determining the solids content by dividing the weight of the non-volatile content by the total sample weight and multiplying by 100. This procedure was used to determine the solids content in each of the examples below. The resulting aqueous dispersion of the cationic polymeric dispersant had a solids content of 16.70%.

The weight average molecular weight ($M_w$) and z-average molecular weight ($M_z$) were determined by Gel Permeation Chromatography (GPC). For polymers having a z-average molecular weight of less than 900,000, GPC was performed using a Waters 2695 separation module with a Waters 410 differential refractometer (RI detector), polystyrene standards having molecular weights of from approximately 500 g/mol to 900,000 g/mol, dimethylformamide (DMF) with 0.05 M lithium bromide (LiBr) as the eluent at a flow rate of 0.5 mL/min, and one Asahipak GF-510 HQ column for separation. With respect to polymers having a z-average molecular weight ($M_z$) of greater than 900,000 g/mol, GPC was performed using a Waters 2695 separation module with a Waters 410 differential refractometer (RI detector), polystyrene standards having molecular weights of from approximately 500 g/mol to 3,000,000 g/mol, dimethylformamide (DMF) with 0.05 M lithium bromide (LiBr) as the eluent at a flow rate of 0.5 mL/min, and one Asahipak GF-7M HQ column for separation. This procedure was followed for all of the molecular weights measurements included in the Examples. It was determined that the cationic polymeric dispersant had a weight average molecular weight of 207,774 g/mol, and a z-average molecular weight of 1,079,872 g/mol.

Example 2: Synthesis of Comparative Cationic Acrylic Polymer A in the Presence of a Polymeric Dispersant

TABLE 2

| Charge # | Material | Amount (g) |
| --- | --- | --- |
| 1 | Product of Example 1 (dispersion comprising the cationic salt group-containing polymeric dispersant) | 726.1 |
|   | Deionized Water | 680.1 |
| 2 | Ethyl acrylate | 87.6 |
|   | Styrene | 93.8 |
|   | 2-Hydroxypropyl methacrylate | 20.9 |
|   | Trimethylolpropane triacrylate | 6.2 |
| 3 | Deionized Water | 26.7 |
|   | Hydrogen Peroxide (35% in Deionized Water) | 3.2 |
| 4 | Iso-Ascorbic Acid | 0.6 |
|   | Ferrous ammonium sulfate | 0.006 |
|   | Deionized Water | 43.6 |
| 5 | Deionized Water | 5.0 |
|   | Hydrogen Peroxide (35% in Deionized Water) | 0.09 |

TABLE 2-continued

| Charge # | Material | Amount (g) |
|---|---|---|
| 6 | Iso-Ascorbic Acid | 0.09 |
|  | Deionized Water | 5.0 |

An aqueous dispersion of Comparative Cationic Acrylic Polymer A was formed from the ingredients included in Table 2. Cationic Acrylic Polymer A includes the cationic polymeric dispersant and an ethylenically unsaturated monomer composition having 10% by weight of a hydroxyl-functional (meth)acrylate (2-hydroxypropyl methacrylate), based on the weight of the ethylenically unsaturated monomer composition. The Comparative Cationic Acrylic Polymer A was prepared as follows: Charge 1 was added to a 4-necked flask fitted with a thermocouple, nitrogen sparge, and a mechanical stirrer. Under a nitrogen blanket and rigorous stirring, the flask was heated to 25° C. At 25° C., the solution was sparged under nitrogen for an additional 30 minutes. Charge 2 was then added to the reaction vessel over 10 minutes. Charge 3 was then added to the reaction vessel over 2-3 minutes. The components of charge 4 were mixed together and added to the reactor through an addition funnel over 30 minutes. The reaction was allowed to exotherm during the addition of charge 4. After the addition was complete, the reactor was heated to 50° C. and held at that temperature for 30 minutes. Charges 5 and 6 were added dropwise and held for 30 minutes at 50° C. The reactor was then cooled to ambient temperature.

The solids content of the resulting aqueous dispersion of Cationic Acrylic Polymer A was determined using the method described in Example 1. The measured solids content was 19.23%. The weight average molecular weight of Acrylic Polymer A was 655,838 g/mol and the z-average molecular weight of Acrylic Polymer A was 1,395,842 g/mol, as measured according to the method described in Example 1.

Example 3: Synthesis of Experimental Cationic Acrylic Polymer B in the Presence of a Polymeric Dispersant

TABLE 3

| Charge # | Material | Amount (g) |
|---|---|---|
| 1 | Product of Example 1 (dispersion comprising the cationic salt group-containing polymeric dispersant) | 773.9 |
|  | Deionized Water | 2,087.9 |
| 2 | 2-Hydroxyethyl acrylate | 208.5 |
| 3 | Deionized Water | 92.4 |
|  | Hydrogen Peroxide (35% in Deionized Water) | 3.2 |
| 4 | Iso-Ascorbic Acid | 0.6 |
|  | Ferrous ammonium sulfate | 0.006 |
|  | Deionized Water | 151.3 |
| 5 | Deionized Water | 32.8 |
|  | Hydrogen Peroxide (35% in Deionized Water) | 0.09 |
| 6 | Iso-Ascorbic Acid | 0.09 |
|  | Deionized Water | 33.4 |

An aqueous dispersion of Cationic Acrylic Polymer B was formed according to the formulation disclosed in Table 2. Cationic Acrylic Polymer B includes the cationic polymeric dispersant and a second stage ethylenically unsaturated monomer composition having 100% by weight of a hydroxyl-functional (meth)acrylate (2-hydroxyethyl acrylate), based on the weight of the second stage ethylenically unsaturated monomer composition. To prepare the dispersion, charge 1 was added to a 4-necked flask fitted with a thermocouple, nitrogen sparge, and a mechanical stirrer. Under an N2 blanket and rigorous stirring, the flask was heated to 25° C. At 25° C., the solution was sparged under nitrogen for an additional 30 minutes. Charge 2 was added to the reaction vessel over 10 minutes. Charge 3 was added to the reaction vessel over 2-3 minutes. Charge 4 is mixed together and added through an addition funnel over 30 minutes. The reaction is allowed to exotherm during the addition. After the addition is complete, the reactor is heated to 50° C. and held at that temperature for 30 minutes. Charges 5 and 6 were added dropwise and held for 30 minutes at 50° C. The reaction is then cooled to ambient temperature.

The solids content of the resulting aqueous dispersion of Cationic Acrylic Polymer B was determined using the method described in Example 1. The measured solids content was 10.05%. The weight average molecular weight of Acrylic Polymer B was 641,805 g/mol and the z-average molecular weight of Acrylic Polymer B was 2,144,615 g/mol, as measured according to the method described in Example 1.

Example 4: Preparation of Cationic Resin C

TABLE 4

| Charge # | Material | Amount (g) |
|---|---|---|
| 1 | DER 732[1] | 640.7 |
| 2 | Bisphenol A | 155.2 |
| 3 | Butyl Carbitol formal[2] | 7.96 |
| 4 | Benzyldimethyl amine | 1.50 |
| 5 | Butyl Carbitol formal[2] | 3.12 |
| 6 | Butyl Carbitol formal[2] | 49.5 |
| 7 | JEFFAMINE D400[3] | 160.5 |
| 8 | Butyl Carbitol formal[2] | 7.96 |
| 9 | Bisphenol A digylcidyl ether[4] | 17.4 |
| 10 | Butyl Carbitol formal[2] | 6.20 |
|  | Resin used from reaction product of materials 1-10 | 913.5 |
| 11 | Deionized water | 1065.8 |
| 12 | Lactic Acid (88%) | 47.8 |
| 13 | Ethoxylated coco amine surfactant[5] | 59.3 |
| 14 | Deionized water | 1243.7 |

[1]Aliphatic epoxy resin available from Dow Chemical Co.
[2]Available as MAZON 1651 from BASF Corporation
[3]A polypropylene oxide resin terminated with primary amines available from Huntsman Corp.
[4]Available from Hexion Corporation as EPON 828
[5]Available from Solvay as Rhodameen C5

Charges 1, 2 and 3 were charged into a 3-liter round-bottomed flask fitted with a stirrer and temperature measuring probe and blanketed with nitrogen. The mixture was heated to 130° C. Charges 4 and 5 were mixed together and added to the mixture with the heat off. The mixture exothermed to 135° C. and heat was added as necessary to hold the temperature at 135° C. for approximately two hours. The epoxide equivalent weight was checked every 30 minutes and the increase in epoxide equivalent weight plotted with time. Heating continued at 135° C. for the time extrapolated for the epoxide equivalent weight of the mixture to reach 1,232 g/epoxide group. The heat was removed, charge 6 was added and the mixture was allowed to cool to 100° C. over a period of approximately 20 minutes under agitation. Charge 7 was then added and immediately followed by charge 8 to rinse the line into the reactor. Following the exotherm, heat was applied to hold the reaction temperature at 95° C. until the Gardner-Holdt viscosity of a sample of resin diluted 50/50 in methoxy propanol was "L". A mixture of charges 9 and 10 were added and the mixture was held at 95° C. until the Gardner-Holdt viscosity of a sample of the resin diluted 50/50 in methoxy propanol was "P-Q". 913.5 g of this resin was poured into a mixture of 1,065.8 g of deionized water and 47.8 g of an 88% solution of lactic acid in water at ambient temperature and mixed for 45 minutes. Charge 13 was added and the mixture stirred for 40 minutes at ambient temperature. 1,243.7 g of deionized water was then added and the mixture stirred for an additional three hours at ambient temperature. The final aqueous dispersion had a measured solids content of 30.5%, as determined using the method described in Example 1.

Example 5: Preparation of Cationic Resin D: Main Film-Forming Resin

This example describes the preparation of a cationic epoxy resin, used as the main film-forming resin, from a mixture of the following ingredients:

Preparation of Blocked Polyisocyanate Curing Agent

TABLE 5

| Charge # | Material | Amount (g) |
| --- | --- | --- |
| 1 | Dibutyltin dilaurate | 1.3 |
| 2 | Ethyleneglycol monobutyl ether | 945.44 |
| 3 | Diethyleneglycol monobutyl ether | 324.46 |
| 4 | Methyl isobutyl ketone (mibk) | 15.52 |
| 5 | Polymeric MDI Polyisocyanate[1] | 1340.00 |
| 6 | Methyl isobutyl ketone (mibk) | 307.05 |

[1]Rubinate M, available from Huntsman Corporation

Charges 1, 2, 3 and 4 were added to a 4-neck round bottom flask, fit with a stirrer and temperature measuring probe and blanketed with nitrogen. The temperature of the mixture was increased to 30° C. Charge 5 was then added dropwise over a period of 90 minutes, controlling the rate so that the temperature increases and remains at approximately 80° C. due to the exotherm. After the addition was complete, heat was gently applied to adjust the temperature to 90° C. The mixture was held at 90° C. for 60 minutes. A sample was drawn and the mixture was held at 90° C. for an additional 30 minutes while an I.R. spectrum was taken. No residual isocyanate was detected and Charge 6 was added and the mixture allowed to stir at 90° C. for 30 minutes.

Preparation of Cationic Resin D

TABLE 6

| Charge # | Material | Amount (g) |
| --- | --- | --- |
| 1 | Bisphenol A diglycidyl ether[1] | 614.68 |
| 2 | Bisphenol A | 265.42 |
| 3 | MACOL 98 A MOD 1[2] | 125.0 |
| 4 | Methylisobutyl ketone (mibk) | 20.5 |
| 5 | Ethyltriphenyl phosphonium iodide | 0.60 |
| 6 | MACOL 98 A MOD 1[2] | 125.0 |
| 7 | Methylisobutyl ketone (mibk) | 85.5 |
| 8 | Blocked Polyisocyanate Curing Agent (see Table 5 above) | 718.4 |
| 9 | Ketimine[3] | 57.01 |
| 10 | N-methyl ethanolamine | 48.68 |
|  | Resin used from reaction product of materials 1-10 | 1854.8 |

TABLE 6-continued

| Charge # | Material | Amount (g) |
| --- | --- | --- |
| 11 | Sulfamic acid | 40.52 |
| 12 | Deionized water | 1193.2 |
| 13 | Gum rosin solution[4] | 16.5 |
| 14 | Deionized water | 690.0 |
| 15 | Deionized water | 223.3 |
| 16 | Deionized water | 1100.0 |

[1]Epoxy resin available from Hexion Specialty Chemicals as EPON 828
[2]Bisphenol ethylene oxide adduct available from BASF Corporation
[3]MIBK diketimine of diethylene triamine at 72.7% in MIBK
[4]30% by weight solution of gum rosin in diethylene glycol mono butyl ether formal Charges 1, 2, 3, 4 and 5 were charged to a 4-neck round bottom flask, fitted with a stirrer and temperature measuring probe and blanketed with nitrogen. The mixture was heated to 130° C. and was allowed to exotherm to about 150° C. The temperature was then allowed to drop to 145° C., and the mixture was held at this temperature for 2 hours. Charge 6 was added while allowing the mixture to cool to 125° C. and then charge 7 was added. Charges 8, 9 and 10 were added and the mixture was held at 122° C. for two hours. 1,854.8 g of this resin was poured into a mixture of 1,193.2 g of deionized water, 40.52 g sulfamic acid and 16.5 g of gum rosin solution at room temperature and mixed for 45 minutes. Charge 14 was added with stirring over about 30 minutes. Charge 15 was added and mixed for a further 30 minutes. Charge 16 was added and mixed for approximately 15 minutes. Then, about 1,100 g of water and solvent were distilled off under vacuum with heating to approximately 60-65° C. The final aqueous dispersion had a measured solids content of 42.5%, as determined using the method described in Example 1.

Example 6: Preparation of Comparative Coating Composition A

TABLE 7

| Charge # | Material | Amount (g) |
| --- | --- | --- |
| 1 | Cationic Resin C | 240.7 |
| 2 | Butyl Carbitol formal[1] | 11.0 |
| 3 | Methoxy propanol | 6.2 |
| 4 | Cationic Resin D | 1528.5 |
| 5 | DI water | 252.6 |
|  | Subtotal | 2039.0 |
| 6 | Pigment Paste[2] | 350.9 |
| 7 | DI water | 1610.1 |

[1]MAZON 1651 available from BASF Corporation
[2]Pigment paste E6434P available from PPG Industries, Inc.

Charges 1-3 were added sequentially to a plastic container at room temperature under agitation with 10 minutes of stirring after each addition. Charge 4 was added to a separate one-gallon plastic container with agitation. Charge 5 was slowly added to the mixture of charges 1-3 and then this water-thinned mixture was slowly added to charge 4 followed by 5 minutes of additional stirring. The sub-total of charges 1 through 5 represents the total weight of the resin blend. 350.9 g of charge 7 was added to charge 6 and then added to the resin blend which was then allowed to stir until uniform, a minimum of 30 minutes. The remainder of charge 7 was added and the coating composition was allowed to stir until uniform, a minimum of 30 minutes. The resulting cationic electrodepositable coating composition had a solids content of 23.0% as measured according to the method described in Example 1, and a pigment to resin ratio of 0.15/1.0 by weight.

After 25% ultrafiltration (and reconstitution with deionized water), coated panels were prepared from a bath containing the cationic electrodepositable coating composition by the procedure described below, and the coated knife blades were evaluated for edge coverage. The results are reported below.

Example 7: Preparation of Comparative Coating Composition B and Experimental Coating Composition C

TABLE 8

| | | Amount (g) | |
|---|---|---|---|
| Charge # | Material | Coating Composition B | Coating Composition C |
| 1 | Cationic Resin C | 228.6 | 228.6 |
| 2 | Butyl Carbitol formal[1] | 11.0 | 11.0 |
| 3 | Methoxy propanol | 6.2 | 6.2 |
| 4 | Cationic Resin D | 1528.5 | 1528.5 |
| 5 | Cationic Acrylic Polymer A | 19.2 | — |
| 5 | Cationic Acrylic Polymer B | — | 35.3 |
| 6 | DI Water | 245.2 | 229.3 |
| 7 | Pigment Paste[2] | 350.9 | 350.9 |
| 8 | DI Water | 1610.1 | 1610.1 |

[1]Available as MAZON 1651 from BASF Corporation
[2]Pigment paste E6434P available from PPG Industries, Inc.

For each coating composition, charges 1-3 were added sequentially to a plastic container at room temperature under agitation with 10 minutes of stirring after each addition. Charge 4 was added to a separate one-gallon plastic container with agitation. 100 g of Charge 6 was slowly added to the mixture of charges 1-3 and then this water-thinned mixture was slowly added to charge 4 followed by 5 minutes of additional stirring. Charge 5 was pre-blended 1:1 by weight with a partial amount of charge 6 and was then added to the mixture containing charges 1-4 and stirred for 5 minutes. The remainder of charge 6 was then added. The sum of charge 5 and charge 6 was a constant to account for differences in the % solids associated with each dispersion of Examples 1-2 so that the combination of charges 5 and 6 introduced the same amount of weight and % solids for each coating composition. The amount of solids from Acrylic Polymer A and Acrylic Polymer B was kept fixed at 0.5% by weight of resin blend solids for each coating composition. The sum of charges 1 through 6 represents the total weight of the resin blend. An equal weight of charge 8 was added to charge 7 and then added to the coating composition which was then allowed to stir until uniform, a minimum of 30 minutes. The remainder of charge 8 was added and the coating composition was allowed to stir until uniform, a minimum of 30 minutes. The resulting cationic electrodepositable coating compositions had a solids content of 23.0% as measured according to the method described in Example 1, and a pigment to resin ratio of 0.15/1.0 by weight.

After 25% ultrafiltration (and reconstitution with deionized water), coated knife blades were prepared from baths separately containing the cationic electrodepositable coating compositions by the procedure described below, and the coated knife blades were evaluated for edge corrosion. The results are reported below.

Evaluation of Coating Composition Examples—Edge Corrosion Testing

The above described electrodepositable coating compositions were then electrodeposited onto steel utility knife blades having dimensions of ¾"×4" (2 cm×10 cm) that were pretreated with CHEMFOS C700/DI (commercially available from PPG Industries, Inc.) by the blade manufacturer. These knife blades are available from ACT Laboratories of Hillside, Mich. The blades were electrocoated in a manner well known in the art by immersing them into a stirring bath containing the electrodepositable coating composition heated to a temperature of 30° C., connecting the cathode of a direct current rectifier to the blade and connecting the rectifier's anode to stainless steel tubing used to circulate cooling water for bath temperature control. A voltage of 160 volts was applied for 115 seconds to deposit an adherent film of the coating composition.

After electrodeposition, the blades were removed from the bath and rinsed vigorously with a spray of deionized water and the applied coating was cured by baking the coated knifes for 25 minutes at 178° C. in an electric oven. The electrocoat film build was measured to be approximately 0.65 mils (16.51 microns) using a Fischer Dualscope FMP40C which had been calibrated for phosphated knife blades using shims of known coating thicknesses.

Edge corrosion testing evaluates the ability of an electrodeposited coating to cover a sharp edge, protecting it from corrosion (also known as edge coverage). Several methods are utilized to evaluate the degree to which the electrodeposited coating provides edge coverage.

The beverage can industry measures coverage of the thin coating inside a can using a WACO Enamel Rater instrument, which measures the current flow through a 1% sodium chloride solution in an operating range from 0 to 500 milliamperes, when a 6.2-volt potential difference is applied between the outside of the can and a stainless-steel anode placed in the center of the salt solution (electrolyte) inside the can. The greater the coating coverage, the lower the current passed. This method was adopted for use in evaluating the coated knife blades, and the procedure is defined as the Enamel Rating Procedure herein. Instead of a coated can being the tested work piece, a stainless-steel beaker becomes the cathode and the test piece, the coated blade, is electrically connected to the anode and the blade is lowered into the 1% sodium chloride solution to a depth of 2.5 inches from the tip of the blade, so that a fixed surface area of blade is below the surface of the electrolyte. A 6.2-volt potential difference is applied between the stainless-steel beaker and the coated knife blade and the amount of current passed is an indication of the extent of coverage of the knife blade with the electrodeposited coating. The coated knife blades were visually inspected for evidence of defects (e.g., pinholes) and only those which had no defects on the coated front, back and back edges, were selected for testing. As a result, the current passed is a reflection of the degree of coverage of the electrodeposited coating on the sharp edge of the knife blade. Since there is some variation from blade to blade, current measurements were taken on six separate blades and the results were averaged. The results are reported in Table 9 and indicate that knife blades coated with Coating Composition C that contained Experimental Acrylic Polymer B showed much better edge corrosion performance than knife blades coated with Coating Composition B that contained Comparative Acrylic Polymer A or Coating Composition A that did not contain either Acrylic Polymer A or Acrylic Polymer B. This result was surprising and not expected.

In a second measure of edge coverage, a set of coated knife blades were subjected to salt spray exposure for a period of 5 days such that any areas of the sharp edge of the blade not well protected by the electrocoat will develop rust spots. The salt spray test is described in detail in ASTM B117. After the exposure to salt spray, the number of rust spots on the metal edges of the knife blades were visually evaluated over the length of the knife blade, i.e., the rust spots were counted with the assistance, if necessary, of a microscope and/or magnifying glass. This procedure is defined as the Salt-Spray Corrosion Procedure herein. The results are presented in Table 9 and indicate that the knife blades coated with Coating Composition C that contained Experimental Acrylic Polymer B showed much better edge corrosion performance than the knife blades coated with either Coating Composition B that contained Comparative Acrylic Polymer A or Coating Composition A that did not contain Acrylic Polymer A or Acrylic Polymer B. This result was surprising and not expected.

The coated knife blades were also evaluated for gloss. 20° and 60° gloss were measured using a BYK-Gardner Hazemeter (catalog no. 4601) according to ASTM D523.

TABLE 9

Knife Blade Results

| Coating Comp. | Acrylic Polymer Example | Enamelrater Reading, mA | Rust Spots per knife blade, after 5 days salt spray exposure | Gloss Values 20° | 60° |
|---|---|---|---|---|---|
| A | None | 124 | 124 | 21.7 | 65.2 |
| B | Comparative Acrylic Polymer A | 122 | 96 | 18.6 | 62.2 |
| C | Experimental Acrylic Polymer B | 45 | 28 | 8.8 | 45.5 |

As shown in Table 9, Coating Composition A, which contains no acrylic polymer additive, showed the poorest knife blade edge coverage performance with the highest degree of current flow and the highest rust spot count after 5 days of salt spray exposure. Coating Composition B, which includes Comparative Acrylic Polymer A as an additive, showed marginally improved knife blade edge corrosion performance with equal current flow and a marginally better rust spot count after 5 days of salt spray exposure. Coating Composition C, which includes Experimental Acrylic Polymer B as an additive, showed significant improvements in knife blade edge coverage performance through a significant reduction in current flow and the number of rust spots after 5 days of salt spray exposure.

These results indicate that the use of Experimental Acrylic Polymer B resulted in significant improvement on the edge coverage of the cured coating as demonstrated through significantly improved resistance to current flow and a reduced number of rust spots counted on knife blade edges after 5 days of salt spray exposure.

These results further show that Coating Composition C, which includes Experimental Acrylic Polymer B as an additive, had a lower resulting gloss value for both 20° gloss and 60° gloss compared to Coating Composition A, which contains no acrylic polymer additive, and Coating Composition B, which includes Comparative Acrylic Polymer A as an additive.

Example 8: Synthesis of a Cationic Salt Group-Containing Polymeric Dispersant

TABLE 10

| Charge # | Material | Amount (g) |
|---|---|---|
| 1 | Dowanol ™ PnB | 65.0 |
|   | Dowanol ™ PM | 83.5 |
|   | Butyl Cellosolve | 198.5 |
|   | Deionized Water | 13.9 |
| 2 | Ethyl Acrylate | 353.4 |
|   | Styrene | 62.1 |
|   | 2-Hydroxypropyl Methacrylate | 93.0 |
|   | Methyl methacrylate | 260.4 |
|   | Glycidyl methacrylate | 139.5 |
|   | Allyl methacrylate | 11.5 |
|   | t-Dodecyl mercaptan | 9.3 |
| 3 | Vazo ™ 67[1] | 18.5 |
|   | Dowanol ™ PNB | 29.5 |
|   | Dowanol ™ PM | 14.8 |
|   | Methyl isobutyl ketone | 11.8 |
| 4 | Lupersol 7M50 | 18.6 |
|   | Dowanol ™ PNB | 14.8 |
|   | Dowanol ™ PM | 7.4 |
| 5 | Butyl Cellosolve | 80.3 |
| 6 | Diethanolamine | 99.6 |
| 7 | Deionized Water | 3,334.0 |
|   | Formic Acid (90% in water) | 34.20 |
| 8 | Deionized Water | 1,151.5 |

[1]2,2'-azobis(2-methylbutyronitrile) free radical initiator available from The Chemours Company A cationic salt group-containing polymeric dispersant was prepared from the components listed in Table 1 according to the following procedure: Charge 1 was added to a 4-necked flask fitted with a thermocouple, nitrogen sparge, and a mechanical stirrer. Under a nitrogen blanket and agitation, the flask was heated to reflux with a temperature set point of 100° C. Charges 2 and 3 were added dropwise from an addition funnel over 150 minutes followed by a 30-minute hold. After increasing the temperature to 120° C., charge 4 was subsequently added over 15 minutes followed by a 10-minute hold. The temperature was decreased to 110° C. while adding charge 5 to help cool the reaction. Charge 6 was added and the temperature was held at 115° C. for 3 hours. During the hold, charge 7 was heated to approximately 35-40° C. in a separate container outfitted with a mechanical stirrer. After the hold, the contents from the reactor were poured into the container that includes charge 7 under rapid agitation and then held for 60 minutes. Charge 8 was added under agitation as the dispersion continued to cool to ambient temperature (about 25° C.).

The solids content of the resulting aqueous dispersion of the cationic polymeric dispersant was determined using the method described in Example 1. The measured solids content was 17.8%.

Example 9: Synthesis of Experimental Cationic Acrylic Polymer E in the Presence of a Polymeric Dispersant

TABLE 11

| Charge # | Material | Amount (g) |
| --- | --- | --- |
| 1 | Product of Example 1 (dispersion comprising the cationic salt group-containing polymeric dispersant) | 773.9 |
|   | Deionized Water | 2,087.9 |
| 2 | 2-Hydroxyethyl acrylate | 208.5 |
| 3 | Deionized Water | 92.4 |
|   | Hydrogen Peroxide (35% in Deionized Water) | 3.2 |
| 4 | Iso-Ascorbic Acid | 0.6 |
|   | Ferrous ammonium sulfate | 0.006 |
|   | Deionized Water | 151.3 |
| 5 | Deionized Water | 32.8 |
|   | Hydrogen Peroxide (35% in Deionized Water) | 0.09 |
| 6 | Iso-Ascorbic Acid | 0.09 |
|   | Deionized Water | 33.4 |

An aqueous dispersion of Cationic Acrylic Polymer E was formed according to the formulation disclosed in Table 10. Cationic Acrylic Polymer E includes the cationic polymeric dispersant and a second stage ethylenically unsaturated monomer composition having 100% by weight of a hydroxyl-functional (meth)acrylate (2-hydroxyethyl acrylate), based on the weight of the second stage ethylenically unsaturated monomer composition. To prepare the dispersion, charge 1 was added to a 4-necked flask fitted with a thermocouple, nitrogen sparge, and a mechanical stirrer. Under an N2 blanket and rigorous stirring, the flask was heated to 25° C. At 25° C., the solution was sparged under nitrogen for an additional 30 minutes. Charge 2 was added to the reaction vessel over 10 minutes. Charge 3 was added to the reaction vessel over 2-3 minutes. Charge 4 is mixed together and added through an addition funnel over 30 minutes. The reaction is allowed to exotherm during the addition. After the addition is complete, the reactor is heated to 50° C. and held at that temperature for 30 minutes. Charges 5 and 6 were added dropwise and held for 30 minutes at 50° C. The reaction is then cooled to ambient temperature.

The solids content of the resulting aqueous dispersion of Cationic Acrylic Polymer E was determined using the method described in Example 1. The measured solids content was 10.38%. The weight average molecular weight of Acrylic Polymer E was 519,712 g/mol and the z-average molecular weight of Acrylic Polymer E was 1,532,906 g/mol, as measured according to the method described in Example 1.

Example 10: Preparation of Cationic Resins F-1 and F-2: Main Film Forming Resins This example describes the preparation of additional cationic epoxy resins, used as the main film-forming resins, from a mixture of the following ingredients:

Preparation of Blocked Polyisocyanate Curing Agent

TABLE 12

| # | Material | Amount (g) |
| --- | --- | --- |
| 1 | Dibutyltin dilaurate | 1.3 |
| 2 | Ethyleneglycol monobutyl ether | 945.44 |
| 3 | Diethyleneglycol monobutyl ether | 324.46 |
| 4 | Methyl isobutyl ketone (mibk) | 15.52 |
| 5 | Polymeric MDI Polyisocyanate[1] | 1340.00 |
| 6 | Methyl isobutyl ketone (mibk) | 307.05 |

[1]Rubinate M, available from Huntsman Corporation

Charges 1, 2, 3 and 4 were added to a 4-neck round bottom flask, fit with a stirrer and temperature measuring probe and blanketed with N2. The temperature was raised to 30° C. Charge 5 was added dropwise over a period of 90 minutes, controlling the rate so that the temperature increases to approximately 80° C. due to the exotherm. After the addition was complete, heat was gently applied to adjust the temperature to 90° C. The mixture was then held at 90° C. for 60 minutes. A sample was drawn and the mixture held at 90° C. for an additional 30 minutes while an I.R. spectrum was taken. No residual isocyanate detected and Charge 6 was added and the mixture allowed to stir at 90° C. for a final 30 minutes.

Preparation of Cationic Resins F-1 and F-2

TABLE 13

| # | Material | Resin F-1 Amount, g | Resin F-2 Amount, g |
| --- | --- | --- | --- |
| 1 | Bisphenol A diglycidyl ether[1] | 614.68 | 614.68 |
| 2 | Bisphenol A | 265.42 | 265.42 |
| 3 | MACOL 98 A MOD 1[2] | 191.1 | 226.0 |
| 4 | Methylisobutyl ketone (mibk) | 21.9 | 22.6 |
| 5 | Ethyltriphenyl phosphonium iodide | 0.60 | 0.6 |
| 6 | Vorapel D3201[3] | 58.9 | 24.0 |
| 7 | Methylisobutyl ketone (mibk) | 84.2 | 83.5 |
| 8 | Crosslinker (see above) | 718.4 | 718.4 |
| 9 | Ketimine[4] | 57.01 | 57.01 |
| 10 | N-methyl ethanolamine | 48.68 | 48.68 |
|   | Resin from reaction product of materials 1-10 | 1854.8 | 1854.8 |
| 11 | Sulfamic acid | 40.52 | 40.52 |
| 12 | Deionized water | 1193.2 | 1193.2 |
| 13 | Gum rosin solution[5] | 16.5 | 16.5 |
| 14 | Deionized water | 690.0 | 690.0 |
| 15 | Deionized water | 699.1 | 699.1 |
| 16 | Deionized water | 1100.0 | 1100.0 |

[1]Epoxy resin available from Hexion Specialty Chemicals as EPON 828 [2]Bisphenol ethylene oxide adduct available from BASF Corporation [3]Polyalkylene oxide polymer available from Dow Chemical Co.
[4]MIBK diketimine of diethylene triamine at 72.7% in MIBK
[5]30% by weight solution of gum rosin in diethylene glycol mono butyl ether formal Charges 1, 2, 3, 4 and 5 were charged to a 4-neck round bottom flask, fitted with a stirrer and temperature measuring probe and blanketed with N2. The mixture was heated to 130° C. The mixture was allowed to exotherm to about 150° C. The temperature was allowed to drop to 145° C., and the mixture was held at this temperature for 2 hours. Charge 6 was added while allowing the mixture to cool to 125° C. and then charge 7 was added. Charges 8, 9 and 10 were added and the mixture was held at 122° C. for two hours. 1,854.8 g of this resin was poured into a mixture of 1193.2 g of deionized water, 40.52 g sulfamic acid and 16.5 g of gum rosin solution at room temperature and mixed for 45 minutes. Charge 14 was added with stirring over about 30 minutes. Charge 15 was added and mixed for a further 30 minutes. Charge 16 was added and mixed for approximately 15 minutes. Then, about 1,100 g of water and solvent were distilled off under vacuum at 60-65° C. The final aqueous dispersion had a measured solids content of 38.0%, determined as described previously. Cationic resins F-1 and F-2 contained 3.10% and 1.26% Vorapel D3201 on resin solids, respectively.

Example 11: Preparation of Experimental Coating Compositions D, E F and G

TABLE 14

| Charge # | Material | Coating Composition Amount (g) | | | |
|---|---|---|---|---|---|
| | | Coating D | Coating E | Coating F | Coating G |
| 1 | Cationic Resin C | 240.7 | 240.7 | 240.7 | 240.7 |
| 2 | Butyl Carbitol formal[1] | 11.0 | 11.0 | 11.0 | 11.0 |
| 3 | Methoxy propanol | 6.2 | 6.2 | 6.2 | 6.2 |
| 4 | Cationic Resin D | 1528.5 | 1511.2 | — | — |
| | Cationic Resin F-1 | — | — | 1690.2 | — |
| | Cationic Resin F-2 | — | — | — | 1699.8 |
| 5 | Cationic Acrylic Polymer E | — | 70.58 | 70.58 | 35.3 |
| 6 | DI Water | 252.6 | 199.4 | 20.4 | 46.0 |
| 7 | Pigment Paste[2] | 350.9 | 350.9 | 350.9 | 350.9 |
| 8 | DI Water | 1610.1 | 1610.1 | 1610.1 | 1610.1 |

[1]Available as MAZON 1651 from BASF Corporation
[2]Pigment paste E6434P available from PPG Industries, Inc.

For each coating composition, charges 1-3 were added sequentially to a plastic container at room temperature under agitation with 10 minutes of stirring after each addition. Charge 4 was added to a separate one-gallon plastic container with agitation. For Coating Compositions D and E, 100 g of charge 6 was slowly added to the mixture of charges 1-3 and then this water-thinned mixture was slowly added to charge 4 followed by 5 minutes of additional stirring. Charge 5 was pre-blended 1:1 by weight with a partial amount of charge 6 and was then added to the mixture containing charges 1-4 and stirred for 5 minutes. The remainder of charge 6 was then added. For Coating Compositions F and G, the mixture of charges 1-3 was slowly added to charge 4 followed by 5 minutes of additional stirring. Charge 5 was pre-blended with charge 6 and was then added to the mixture containing charges 1-4 and stirred for 5 minutes. The sum of charges 4, 5 and charge 6 were held constant to account for differences in the % solids associated with each resin of Examples 5, 9 and 10 so that the combination of charges 4, 5 and 6 introduced the same amount of weight and % solids for each coating composition. The amount of solids from Acrylic Polymer E was kept fixed at 1.0% by weight of resin blend solids for Coating Compositions E and F and lowered to 0.5% by weight of resin blend solids for Coating Composition G. Coating Composition F contains 2.5% by weight of Vorapel D3201 on total resin solids. Coating Composition G contains 1.0% by weight of Vorapel D3201 on total resin solids. For each of Coating Compositions F and G, the designated amount of Vorapel D3201 is brought in through Cationic Resins F-1 and F-2, respectively. In each coating composition, the sum of charges 1 through 6 represents the total weight of the resin blend. An equal weight of charge 8 was added to charge 7 and then added to the coating composition which was then allowed to stir until uniform, a minimum of 30 minutes. The remainder of charge 8 was added and the coating composition was allowed to stir until uniform, a minimum of 30 minutes. The resulting cationic electrodepositable coating compositions had a solids content of 23.0% as measured according to the method described in Example 1, and a pigment to resin ratio of 0.15/1.0 by weight.

After 25% ultrafiltration (and reconstitution with deionized water), coated knife blades were prepared from baths separately containing the cationic electrodepositable coating compositions by the procedure described above in Example 7. The coated knife blades were evaluated for edge corrosion according to the method also described in Example 7. The results are reported below.

Evaluation of Coating Composition Examples D-G—Edge Corrosion Testing

Edge corrosion testing was conducted on Coating Compositions D through G according to the knife blade testing described above in Example 7. Gloss measurements were also obtained according to the test method described in Example 7. Since knife blades are known to vary significantly in edge corrosion from one lot to the next, a control formulation is included in each round of testing. For that reason, Coating Composition D was prepared as a replicate of Coating Composition A for this round of testing.

TABLE 15

| Knife Blade Results | | | | | | | |
|---|---|---|---|---|---|---|---|
| Coating Comp. | Acrylic Polymer Example | Amount of Additive (% of resin blend solids) | Amount of Vorapel D3201 (% of total resin solids) | Enamelrater Reading, mA | Rust Spots per knife blade, after 5 days salt spray exposure | Gloss Values | |
| | | | | | | 20° | 60° |
| D | None | — | — | 163 | 143 | 26 | 70 |
| E | Polymer E | 1.0 | — | 95 | 116 | 9 | 45 |
| F | Polymer E | 1.0 | 2.5 | 116 | 55 | 7 | 39 |
| G | Polymer E | 0.5 | 1.0 | 136 | 92 | 14 | 56 |

As shown in Table 15, Coating Composition D, which contains no acrylic polymer additive or Vorapel D3201, showed the poorest knife blade edge coverage performance with the highest degree of current flow and the highest rust spot count after 5 days of salt spray exposure. Coating Composition E, which includes Experimental Acrylic Polymer E as an additive, showed improved knife blade edge corrosion performance with significantly reduced current flow and reduced rust spot count after 5 days of salt spray exposure. Coating Composition F, which includes Experimental Acrylic Polymer E and Vorapel D3201 as an additive, showed significant improvements in knife blade edge coverage performance through a reduction in current flow and a significant reduction in the number of rust spots after 5 days of salt spray exposure. Coating Composition G, which includes Experimental Acrylic Polymer E and Vorapel D3201 as an additive, both at lower levels than Coating Composition F, also showed reduced current flow and reduced rust spot count after 5 days of salt spray exposure.

These results indicate that the use of Experimental Acrylic Polymer E, having a lower molecular weight than Experimental Acrylic Polymer B, but added to the formula at a higher level than in the Experimental Acrylic Polymer B, also resulted in significant improvement on the edge coverage of the cured coating as demonstrated through significantly improved resistance to current flow and a reduced number of rust spots counted on knife blade edges after 5 days of salt spray exposure.

These results further show that Coating Compositions E, F and G, which include Experimental Acrylic Polymer E as an additive, with or without the addition of Vorapel D3201 as an additive, had a lower resulting gloss value for both 20° gloss and 60° gloss compared to Coating Composition D, which contains no acrylic polymer additive.

Evaluation of Coating Composition Examples
D-G—Burr Edge Coverage

As an additional means of testing edge corrosion, test panels were specially prepared from cold rolled steel panels, 4×12×0.031 inches, pretreated with CHEMFOS C700/DI and available from ACT Laboratories of Hillside, Mich. The 4×12×0.31-inch panels were first cut into two 4×5¾-inch panels using a Di-Acro Hand Shear No. 24 (Di-Acro, Oak Park Heights, Minn.). The panels are positioned in the cutter so that the burr edge from the cut along the 4-inch edge ends up on the opposite side from the top surface of the panel. Each 4×5¾ panel is then positioned in the cutter to remove ¼ of an inch from one of the 5¾-inch sides of the panel in such a manner that the burr resulting from the cut faces upward from the top surface of the panel.

The above described electrodepositable paint compositions were then electrodeposited onto these specially prepared panels in a manner well known in the art by immersing them into a stirring bath at 30° C. and connecting the cathode of the direct current rectifier to the panel and connecting the anode of the direct current rectifier to the stainless-steel tubing used to circulate cooling water for bath temperature control. The voltage was increased from 0 to a setpoint voltage of 150V over a period of 30 seconds and then held at that voltage for an additional 120 seconds. This combination of time, temperature and voltage deposited a coating that when cured had a dry film thickness of 17 microns. Three panels were electrocoated for each paint composition. After electrodeposition, the panels were removed from the bath, rinsed vigorously with a spray of deionized water and cured by baking for 25 minutes at 178° C. in an electric oven.

These cured panels were then placed into a salt spray cabinet such that the burr along the 5¾-inch side of the panel was horizontal and at the top with the burr edge facing outward towards the spray. Correspondingly, the burr along the 3¾-inch side of the panel was vertical and the burr edge faced backward. These panels were subjected to salt spray exposure for a period of three days such that any areas along the 5¾-inch (150 mm) length of the burr, not well protected by the electrocoat will develop rust. The salt spray test is the same as that used for testing the knife blades and is described in detail in ASTM B117. After the exposure to salt spray, the length of the burr still well protected by electrocoat, was measured (covered edge+rusted edge=150 mm). Due to panel to panel variation, the burr length of each of three panels was evaluated. The % of coverage remaining along the burr length was then calculated. The average % of coverage of the three burr lengths from the three individual panels was then averaged. As shown in the table below, these averages demonstrated that the differences due to different paint compositions was significantly greater than the difference between panels for a given paint composition. This test method is referred to herein as the Burr Edge Coverage Test Method.

TABLE 16

Salt Spray - Burr Edge Panels

| Coating Comp. | Acrylic Polymer Example | Amount of Acrylic Polymer (% of resin blend solids) | Amount of Vorapel D3201 (% of total resin solids) | Panel # | mm of Coverage (150 mm edge) | % Coverage Remaining | Avg. % edge coverage |
|---|---|---|---|---|---|---|---|
| D | None | — | — | 1 | 18 | 12.00 | 14.4 |
|   |   |   |   | 2 | 30 | 20.00 |   |
|   |   |   |   | 3 | 17 | 11.33 |   |
| E | Polymer E | 1.0 | — | 1 | 52 | 34.67 | 38.4 |
|   |   |   |   | 2 | 81 | 54.00 |   |
|   |   |   |   | 3 | 40 | 26.67 |   |
| F | Polymer E | 1.0 | 2.5% | 1 | 146 | 97.33 | 95.3 |
|   |   |   |   | 2 | 135 | 90.00 |   |
|   |   |   |   | 3 | 148 | 98.67 |   |
| G | Polymer E | 0.5 | 1.0% | 1 | 88 | 58.67 | 60.2 |
|   |   |   |   | 2 | 123 | 82.00 |   |
|   |   |   |   | 3 | 60 | 40.00 |   |

As shown in Table 16, Coating Composition D, which contains no acrylic polymer additive or Vorapel D3201, demonstrated the poorest edge coverage performance. Coating Composition E, which includes Experimental Acrylic Polymer E as an additive, showed improved edge corrosion performance. Coating Composition F, which includes Experimental Acrylic Polymer E and Vorapel D3201 as an additive, showed significant improvements in edge coverage with the highest percentage of edge coverage remaining after exposure. Coating Composition G, which includes Experimental Acrylic Polymer E and Vorapel D3201 as an additive, both at lower levels than Coating Composition F, also showed improved edge coverage performance.

These results demonstrate that Coating Compositions E, F and G, which include Experimental Acrylic Polymer E as an additive, with or without the addition of Vorapel D3201 as an additive, resulted in significant improvement on the edge coverage of the cured coating as demonstrated through significantly improved edge coverage remaining after salt spray exposure, compared to Coating Composition D, which contains no acrylic polymer additive.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. An electrodepositable coating composition comprising:
    (a) an acrylic polymer comprising a polymerization product of a polymeric dispersant and a second stage ethylenically unsaturated monomer composition comprising greater than 40% by weight of a second stage hydroxyl-functional (meth)acrylate monomer, based on the total weight of the second stage ethylenically unsaturated monomer composition;
    (b) an ionic salt group-containing film-forming polymer different from the acrylic polymer; and
    (c) a curing agent.

2. The electrodepositable coating composition of claim 1, wherein the second stage hydroxyl-functional (meth)acrylate monomer comprises a primary hydroxyl group.

3. The electrodepositable coating composition of claim 1, wherein the second stage hydroxyl-functional (meth)acrylate monomer comprises a $C_1$-$C_5$ hydroxyalkyl (meth)acrylate.

4. The electrodepositable coating composition of claim 1, wherein the second stage hydroxyl-functional (meth)acrylate monomer comprises hydroxyethyl (meth)acrylate, hydroxypropyl (meth)acrylate, hydroxybutyl (meth)acrylate, hydroxypentyl (meth)acrylate or a combination thereof.

5. The electrodepositable coating composition of claim 1, wherein the polymeric dispersant comprises an ionic salt group-containing polymeric dispersant.

6. The electrodepositable coating composition of claim 1, wherein the polymeric dispersant comprises a polymerization product of a first stage ethylenically unsaturated monomer composition comprising:
    (a) a $C_1$-$C_{18}$ alkyl (meth)acrylate;
    (b) a first stage hydroxyl-functional (meth)acrylate;
    (c) a vinyl aromatic compound;
    (d) an epoxide functional ethylenically unsaturated monomer; and
    (e) a monomer comprising two or more ethylenically unsaturated groups per molecule.

7. The electrodepositable coating composition of claim 1, wherein the polymeric dispersant comprises a polymerization product of a first stage ethylenically unsaturated monomer composition comprising:
    (a) a $C_1$-$C_{18}$ alkyl (meth)acrylate;
    (b) a first stage hydroxyl-functional (meth)acrylate;
    (c) a vinyl aromatic compound;
    (d) an acid-functional ethylenically unsaturated monomer; and
    (e) a monomer comprising two or more ethylenically unsaturated groups per molecule.

8. The electrodepositable coating composition of claim 1, wherein the acrylic polymer comprises 19% to 50% by weight of the residue of the polymeric dispersant, and 50% to 81% by weight of the residue of the ethylenically unsaturated monomer composition, the % by weight being based on the total weight of the acrylic polymer.

9. The electrodepositable coating composition of claim 1, wherein the weight ratio of the second stage ethylenically unsaturated monomer composition to the polymeric dispersant is 1:1 to 4.3:1.

10. The electrodepositable coating composition of claim 1, wherein the acrylic polymer has a theoretical hydroxyl-equivalent weight of 120 g/OH to 310 g/OH.

11. The electrodepositable coating composition of claim 1, wherein the acrylic polymer has a theoretical hydroxyl value of 190 mg of KOH/g of acrylic polymer to 400 mg of KOH/g of acrylic polymer.

12. The electrodepositable coating composition of claim 1, wherein the acrylic polymer has a z-average molecular weight of 500,000 g/mol to 5,000,000 g/mol, as determined by Gel Permeation Chromatography using polystyrene calibration standards.

13. The electrodepositable coating composition of claim 1, wherein the acrylic polymer has a weight average molecular weight of 200,000 g/mol to 1,600,000 g/mol, as determined by Gel Permeation Chromatography using polystyrene calibration standards.

14. The electrodepositable coating composition of claim 1, wherein the acrylic polymer is substantially free of silicon.

15. The electrodepositable coating composition of claim 1, wherein the acrylic polymer is substantially free of constitutional units formed from nitrogen-containing monomers.

16. The electrodepositable coating composition of claim 1, wherein the second stage ethylenically unsaturated monomer composition is substantially free of monomers comprising three or more ethylenically unsaturated groups per molecule.

17. The electrodepositable coating composition of claim 1, wherein the ionic salt group-containing film-forming polymer comprises a cationic salt group-containing film-forming polymer.

18. The electrodepositable coating composition of claim 1, wherein the ionic salt group-containing film-forming polymer comprises an anionic salt group-containing film-forming polymer.

19. The electrodepositable coating composition of claim 1, further comprising a polyalkylene oxide polymer.

20. The electrodepositable coating composition of claim 1, wherein:
    (a) the acrylic polymer is present in an amount of 0.1% to 5% by weight;
    (b) the ionic salt group-containing film-forming polymer is present in an amount of 40% to 90% by weight; and
    (c) the curing agent is present in an amount of 10% to 60% by weight, the % by weight based on the total weight of resin solids of the electrodepositable coating composition.

21. A method of coating a substrate comprising electrophoretically applying the electrodepositable coating composition of claim 1 to at least a portion of the substrate.

22. A substrate coated with the electrodepositable coating composition of claim 1 to form a coating in an at least partially cured state.

23. The substrate of claim 22, wherein the coating has a 20° gloss value reduction of at least 20% when the acrylic polymer is present in the electrodepositable coating composition in an amount of 0.5% by weight based on the total resin solids, the gloss values measured according to ASTM D523, and the gloss value reduction compared to a substrate coated with a coating composition that does not comprise the acrylic polymer.

24. The substrate of claim 22, wherein the coating has a 60° gloss value reduction of at least 10% when the acrylic polymer is present in the electrodepositable coating composition in an amount of 0.5% by weight based on the total resin solids, the gloss values measured according to ASTM D523, and the gloss value reduction compared to a substrate coated with a coating composition that does not comprise the acrylic polymer.

25. The substrate according of claim 22, wherein the coated substrate has current flow of less than 100 mA as measured by the Enamel Rating Procedure and the coated substrate has less than 75 rust spots as measured by the Salt-Spray Corrosion Procedure.

* * * * *